US010962068B2

(12) United States Patent
Brandl et al.

(10) Patent No.: US 10,962,068 B2
(45) Date of Patent: Mar. 30, 2021

(54) DISC BRAKE FOR A UTILITY VEHICLE, AND BRAKE PAD SET

(71) Applicant: KNORR-BREMSE Systeme Fuer Nutzfahrzeuge GmbH, Munich (DE)

(72) Inventors: Christian Brandl, Plattling (DE); Michael Hidringer, Hofkirchen (DE); Martin Pleintinger, Eichendorf (DE); Igor Nesmjanowitsch, Hengersberg (DE); Jens Fricke, Vilshofen (DE); Markus Molnar, Fuerstenzell (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 28 days.

(21) Appl. No.: 16/440,469

(22) Filed: Jun. 13, 2019

(65) Prior Publication Data

US 2019/0293133 A1    Sep. 26, 2019

Related U.S. Application Data

(63) Continuation of application No. PCT/EP2017/082629, filed on Dec. 13, 2017.

(30) Foreign Application Priority Data

Dec. 14, 2016  (DE) .................... 10 2016 124 310.8

(51) Int. Cl.
*F16D 65/097* (2006.01)
*F16D 55/00* (2006.01)
*F16D 65/02* (2006.01)

(52) U.S. Cl.
CPC ..... *F16D 65/0977* (2013.01); *F16D 65/0975* (2013.01); *F16D 2055/0029* (2013.01); *F16D 2065/1396* (2013.01)

(58) Field of Classification Search
CPC ............... F16D 65/097; F16D 65/0975; F16D 65/0977; F16D 65/0979; F16D 2055/0029; F16D 2065/1396
(Continued)

(56) References Cited

U.S. PATENT DOCUMENTS 4,491,204 A * 1/1985 Dirauf ................... F16D 65/097
116/208
5,249,647 A * 10/1993 Kobayashi ............ F16D 65/092
188/72.3
(Continued)

FOREIGN PATENT DOCUMENTS

DE       43 01 621 A1   8/1993
DE  10 2007 001 213 A1   7/2008
(Continued)

OTHER PUBLICATIONS

International Search Report (PCT/ISA/210) issued in PCT Application No. PCT/EP2017/082629 dated Apr. 10, 2018 with English translation (four (4) pages).
(Continued)

*Primary Examiner* — Thomas W Irvin
(74) *Attorney, Agent, or Firm* — Crowell & Moring LLP

(57) ABSTRACT

A disc brake for a utility vehicle has a brake caliper which fits around a brake disc, is in the form of a sliding caliper, is fastened to a stationary brake carrier and has a central opening over the brake disc. The disc brake has two brake pads which are arranged in the brake caliper, can be moved in opposite directions and each have a pad carrier plate and a friction lining fastened thereto, and of which an action-side brake pad can be pressed against the brake disc by a tensioning device via at least one brake piston. The disc brake also has at least one spreading device with which the brake caliper can be returned after a displacement caused by braking and after a release of the brake. The spreading
(Continued)

device has resilient spring units which act on the mutually opposing brake pads. The spreading device is arranged in the central opening, and the spring units act directly or indirectly outside the friction linings in at least two attachment interfaces, spaced from each other and from the center, of the brake pads. The spring units are connected to a stationary attachment element in at least one connection interface by at least one connection element.

25 Claims, 42 Drawing Sheets

(58) Field of Classification Search
USPC .............................................. 188/72.3, 73.38
See application file for complete search history.

(56) References Cited

U.S. PATENT DOCUMENTS

| | | | |
|---|---|---|---|
| 5,538,103 A | 7/1996 | Rueckert et al. | |
| 5,549,181 A * | 8/1996 | Evans .................. | F16D 65/097 188/216 |
| 6,378,665 B1 * | 4/2002 | McCormick ........ | F16D 65/0975 188/72.3 |
| 6,719,105 B1 * | 4/2004 | Wemple ................ | F16D 65/097 188/205 A |
| 6,957,724 B2 * | 10/2005 | Gherardi ............. | F16D 65/0975 188/73.38 |
| 8,037,977 B2 * | 10/2011 | Arakawa ............. | F16D 65/0977 188/73.38 |
| 9,212,710 B2 * | 12/2015 | Asakura ................ | F16D 55/227 |
| 9,422,992 B2 * | 8/2016 | Bach ................... | F16D 65/0977 |
| 10,563,713 B2 * | 2/2020 | Fricke ................ | F16D 65/0977 |
| 10,670,091 B2 * | 6/2020 | Fricke .................. | F16D 65/097 |
| 2007/0246312 A1 * | 10/2007 | Bach ................... | F16D 65/0972 188/73.31 |
| 2008/0060888 A1 * | 3/2008 | Arakawa ............. | F16D 65/0977 188/73.45 |
| 2010/0000828 A1 | 1/2010 | Pericevic et al. | |
| 2014/0339026 A1 | 11/2014 | Gutelius et al. | |
| 2015/0008078 A1 | 1/2015 | Asen et al. | |
| 2018/0106308 A1 * | 4/2018 | Fricke .................... | F16D 65/54 |
| 2018/0106309 A1 * | 4/2018 | Fricke ................ | F16D 65/0068 |
| 2018/0106313 A1 * | 4/2018 | Fricke .................... | F16D 65/16 |
| 2020/0141455 A1 * | 5/2020 | Fricke .................... | F16D 65/16 |

FOREIGN PATENT DOCUMENTS

| | | |
|---|---|---|
| DE | 10 2008 051 236 A1 | 4/2010 |
| DE | 10 2012 006 111 A1 | 9/2013 |
| DE | 20 2016 102 686 U1 | 8/2016 |
| FR | 1592769 A | 5/1970 |
| GB | 1 235 367 A | 6/1971 |
| JP | 9-210104 A | 8/1997 |
| JP | 2003-148525 A | 5/2003 |
| JP | 2004-44635 A | 2/2004 |
| JP | 2009-127715 A | 6/2009 |

OTHER PUBLICATIONS

German-language Written Opinion (PCT/ISA/237) issued in PCT Application No. PCT/EP2017/082629 dated Apr. 10, 2018 (five (5) pages).

Russian-language Office Action issued in Russian Application No. 2019122116/11(043215) dated Mar. 26, 2020 with partial English translation (12 pages).

Chinese-language Office Action issued in Chinese Application No. 201780084305.7 dated Mar. 16, 2020 with English translation (10 pages).

Korean-language Office Action issued in Korean Application No. 10-2019-7020442 dated Jul. 31, 2020 with English translation (15 pages).

Japanese-language Office Action issued in Japanese Application No. 2019-527562 dated Sep. 2, 2020 with English translation (19 pages).

* cited by examiner

DISC BRAKE FOR A UTILITY VEHICLE, AND BRAKE PAD SET

CROSS REFERENCE TO RELATED APPLICATIONS

This application is a continuation of PCT International Application No. PCT/EP2017/082629, filed Dec. 13, 2017, which claims priority under 35 U.S.C. § 119 from German Patent Application No. 10 2016 124 310.8, filed Dec. 14, 2016, the entire disclosures of which are herein expressly incorporated by reference.

BACKGROUND AND SUMMARY OF THE INVENTION

The invention relates to a disk brake for a utility vehicle. The invention also relates to a brake pad set.

In the case of a generic disk brake, also known as a sliding-caliper brake, in a braking situation, an action-side brake pad is pressed against a vehicle-side brake disk by way of an application device, which is actuable pneumatically or by electric motor. During the further course of the braking process, the brake caliper is, relative to the brake disk, displaced counter to the application direction of the action-side brake pad, causing the opposite, reaction-side brake pad to be driven along and pressed against the other side of the brake disk.

In the case of the known disk brake, after a release of the brake, the brake caliper remains in said position, in which the brake pads, or at least the reaction-side brake pad, lies against the brake disk duly without pressure but with a rubbing action. The residual rubbing torques of the brake pads that thereby arise during driving operation have a disadvantageous effect because they lead to increased fuel consumption and to a reduction of the service life of the components involved, specifically of the brake disk and of the brake pads.

It is duly the case that the brake pads are released slightly during driving operation for example as a result of a wobbling movement of the brake disk and as a result of vibrations and lateral accelerations during cornering. These effects are, however, not sufficient to prevent said residual rubbing torques in an effective manner.

To counteract this problem, the generic DE 10 2007 001 213 discloses a disk brake having a resetting device which is arranged in one of the guide beams by way of which the brake caliper is displaceably held on the brake carrier, which resetting device has a resilient resetting element by means of which the brake caliper is displaced into an initial position.

This construction has proven successful in principle. However, the use of said known resetting device can lead to problems in the case of compressed-air-actuated disk brakes of heavy utility vehicles, because here there are wide-ranging influences resulting from component tolerances and component deformations, which have the effect that reliable functioning of said resetting device is not permitted in all situations.

Similar problems arise in the case of a disk brake such as that to which DE 10 2012 006 111 A1 relates. Here, a resetting device is arranged on the side which is situated opposite the application device and which faces toward the reaction-side brake pad, whereby effective, in particular automatic resetting of the brake caliper is realized, with a simultaneously minimal effect on the system rigidity.

In any case, the resetting device acts on the brake caliper, wherein the brake carrier functions as a counterbearing.

DE 43 01 621 A1 describes a floating-caliper disk brake having a positionally static brake carrier which has two carrier arms which project over the outer edge of a brake disk, having brake pads which are arranged on both sides of the brake disk and which have in each case one friction pad and one rear plate and which are supported displaceably on the carrier arms, having a floating caliper which is guided axially displaceably on the brake carrier and which engages around the brake shoes and has an actuating device designed for pressing the brake shoes against the brake disk, having a spring arrangement which acts axially on the brake shoes in a brake release direction and which, after the braking operation, assists in the setting of an air gap between the brake shoes and the brake disk. The spring arrangement has at least one spreading spring which is fastened in altogether non-displaceable fashion in an axial direction to a carrier arm of the brake carrier, in that the fastening is performed on a section of the carrier arm situated over the outer edge of the brake disk, and in that the spreading spring has at least two spring arms which lie resiliently in an axial direction against the rear plates of the brake shoes.

US2014/0339026 A1 describes a spreading spring comprising a locking arm which connects the spreading spring to a brake component, a retraction arm; and a preload device which is arranged between the locking arm and the retraction arm, wherein the preload device comprises six or more spiral-shaped loops which store energy during a braking activation and which retract the brake components (brake pad) as soon as the braking process has ended. A brake caliper in the form of a floating caliper, which is not a sliding caliper, is specified. This is suitable for a passenger vehicle but not for a utility vehicle.

The invention is based on the object of further developing a disk brake of the generic type such that, with the simplest structural and cost-effective means, the service life in particular of the brake pads and of the brake disk is lengthened, and the operating costs are altogether lowered.

A further object consists in providing a corresponding brake pad set.

A disk brake for a utility vehicle, having a brake caliper which engages over a brake disk and which is in the form of a sliding caliper and which is fastened to a positionally static brake carrier and which has a central opening over the brake disk, comprises two brake pads which are arranged in the brake caliper and which are movable in opposite directions and which have in each case one pad carrier plate and one friction pad fastened thereto and of which an action-side brake pad can be pressed against the brake disk by way of an application device via at least one brake piston, and comprises at least one spreading device by which the brake caliper can be reset after a braking-induced displacement and release of the brake. The spreading device has resilient spring units which act on the mutually opposite brake pads, wherein the spreading device is arranged in the central opening, and the spring units act directly or indirectly outside of the friction pads in at least two attachment interfaces of the brake pads that are arranged spaced apart from one another with respect to the center. The spring units are connected to a positionally static attachment element in at least one connection interface by at least one connection element.

By means of the design of the disk brake according to the invention, synchronous resetting of both brake pads and resetting of the brake caliper when the brake is released are realized, wherein the synchronicity relates both to the resetting forces and to the resetting travels. Here, the resetting force acts counter to the respective application direction of the two brake pads, that is to say, in the case of the reaction-side brake pad, toward the caliper rear section, and, in the case of the action-side brake pad, toward the caliper head, with gaps with respect to the brake disk being formed.

In order to prevent a residual rubbing torque, use is made of a spring assembly which has, on the one hand, an attachment to a positionally static component (for example brake carrier) and, on the other hand, presses the brake pads away from the brake disk via spring action.

The concepts set forth comprise various exemplary embodiments of a realization of the spring arms from round material.

The use of round material instead of flat material affords a considerable cost advantage since, on the one hand, the tool costs are lower and, on the other hand, there is no material waste. Moreover, manufacturability is additionally considerably improved. The punching of a flat material from stainless steel is only possible to a limited degree for sheet thicknesses starting from 1.5 mm and already leads to considerable tool wear. Since sheet thicknesses above 1.5 mm would be necessary in a comparable flat material design, a round wire variant offers considerable advantages by contrast.

There is special focus here on the attachment interfaces to the brake pads and to the brake carrier. This is the case since the shaping of the round material is subject to other limitations than those of a flat material.

The spreading device expediently engages on the two brake pads at the pad carrier plates, specifically on the side facing toward the friction pad fastened thereto or on the opposite rear side. In order to avoid tilting of the respective brake pad during resetting, the spreading element can engage on the pad rear plates in the center of a friction radius.

A brake pad set according to the invention for the disk brake according to the invention has at least two brake pads with in each case one pad carrier plate and with a friction pad attached to the pad carrier plate, and has the spreading device as indicated above.

To compensate for increasing wear of the friction material, the attachment of the spring arms has a degree of freedom. This degree of freedom serves to prevent multi-axial distortion/tilting of the system.

One embodiment comprises a spring assembly in which the attachment of the spring elements is configured to be displaceable. The friction material wear can thus be compensated for by an axial sliding movement of the spring attachment with respect to a positionally static attachment element.

The assembly of the complete spreading unit, which can also be referred to as centering unit, is designed here such that a certain play is provided at the connection interface between the resilient component and the attachment element (positionally static component). With progressive tightening of the springs, the connection interface is displaced in the direction of the center of the brake (toward the pad retaining clip) as a result of this play.

The attachment of the spring element can be realized by way of example via a compressed sheet metal element, but can vary in its design. What is crucial here is that a displacement in the axial direction of the wire clip is possible.

One advantage here is that the displaceable interface is not present between materials having different properties. Thus, for example, the risk of destruction to the pad rear plate consisting of soft cast material can be reduced. The possibility of attaching the spring element to the pad rear plate is also simplified.

The vibrations which occur during travel facilitate a displacement of the attachment interface, with the result that correct functioning can also be assumed in the case of contamination and/or corrosion.

In one embodiment, the at least one connection element forms a connection which can be rotated about a longitudinal axis of a central section of the attachment element. This is advantageous to compensate for movements and wear.

For this purpose, the at least one connection element can form a connection which is displaceable in the direction of a longitudinal axis of a central section of the attachment element.

A further embodiment provides that the at least one connection element has wing sections which are inclined downwardly in a bow shape and into which at least one spring unit is clipped. This is advantageous for a simple construction and also simple mounting.

In a further embodiment, the at least one connection element can have at least one spacer section as a lug which is inclined downwardly in the longitudinal direction of a base section of the at least one connection element, wherein lateral sections of the at least one spacer section are in contact with a spring unit. A simple support for the spring arms is thereby achieved.

It is advantageous in production terms if the at least one connection element is a metal stamped and bent part.

An alternative embodiment provides that the at least one connection element comprises windings in the manner of a coil, wherein the attachment element extends through the windings. This yields a simple construction.

It is particularly advantageous here if the windings of the at least one connection element are windings of sections of spring arms of the spring unit, since a simple one-piece construction of the spring arms and the connection element is achieved in this way.

In one embodiment, each spring unit comprises a pair of spring arms which are connected by their inner ends which are directed toward the center of the opening. This yields a compact construction.

It is advantageous if the pair of spring arms is formed in one piece, since a number of parts and production costs can thus be reduced.

It is furthermore provided that the other ends of the spring arms of each pair of spring arms have attachment sections which interact in the attachment interfaces of the brake pads. This yields a simple construction.

In one embodiment, the attachment interfaces are arranged on the pad rear plates of the brake pads.

In one embodiment, the attachment interfaces here have receiving openings which take the form of through-holes and/or blind holes.

The receiving openings can also take the form of bores and/or elongated holes.

In an alternative embodiment, the attachment interfaces can have pins.

Another embodiment provides that the attachment interfaces have guide elements.

In a further embodiment, the attachment interfaces can have shoulders with or without mounted guide elements.

A further alternative embodiment provides that the attachment interfaces are arranged indirectly on the pad rear plates of the brake pads on pad retaining springs.

It is advantageous if the spring units and the positionally statically fixed attachment element are formed from a wire material, in particular stainless steel, for example with a circular cross section. This can reduce the production and/or material costs.

A brake pad set of an above-described disk brake has an application-side brake pad, a rear-side brake pad and an above-described spreading device.

In a further embodiment, the brake pads each have at least one pad retaining spring which is provided on each of its ends with a bevel. This allows an advantageous easing of mounting and demounting for the spreading device.

A still further embodiment provides that the receiving openings of the brake carrier horns are each closed by a plug if a spreading device is not present or is removed. This affords advantageous protection against contamination and ingress of moisture.

Here, the plug has a body which is designed to be conical with a handle section and an end section. A conical shape allows simple sealing.

If the body has peripheral beads between which peripheral recesses are arranged, sealing of the receiving opening is improved. For this purpose, at least the beads can be designed to be elastic. The beads can also be configured in the form of lips.

For advantageously simple handling of the plug, the handle section of the body is connected to a handle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
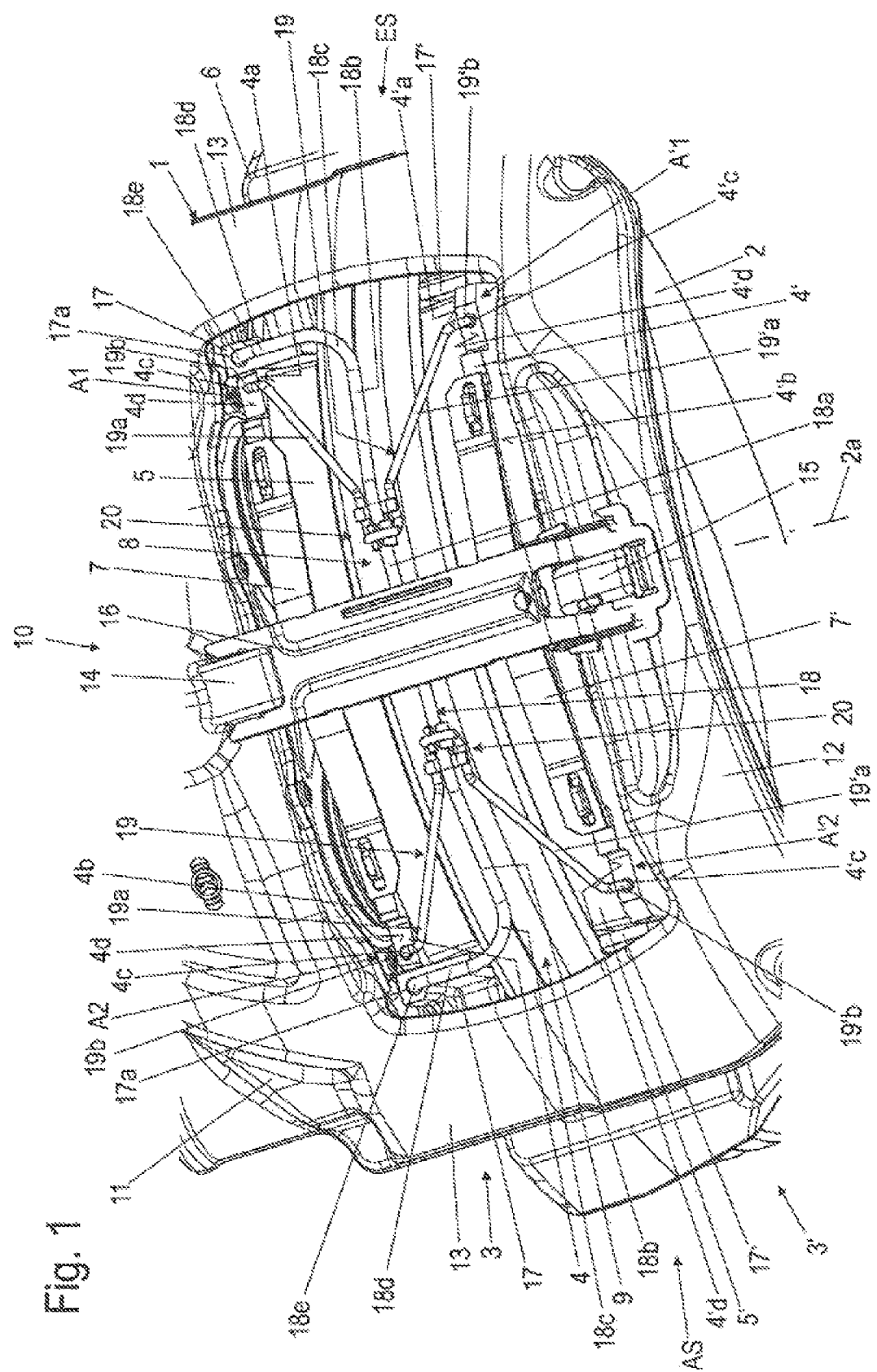
FIG. 1 shows a detail of a disk brake according to the invention with a first exemplary embodiment of a spreading device according to the invention in a schematic perspective plan view.

The expressions "top", "bottom", "left", "right" relate to the respective arrangements in the figures.

A "top side" and a "bottom side" of a brake pad 3, 3' or of a pad carrier plate 4, 4' always relate to the installation situation of the brake pad 3, 3'.

In order to distinguish between components and functional groups on both sides of a brake disk 2 of a disk brake 10, the reference signs of the components and functional groups on the side of the brake disk 2 which faces toward a caliper rear section 12 of the brake caliper 1 of the disk brake 10 are each provided with an apostrophe.

Figure 2:
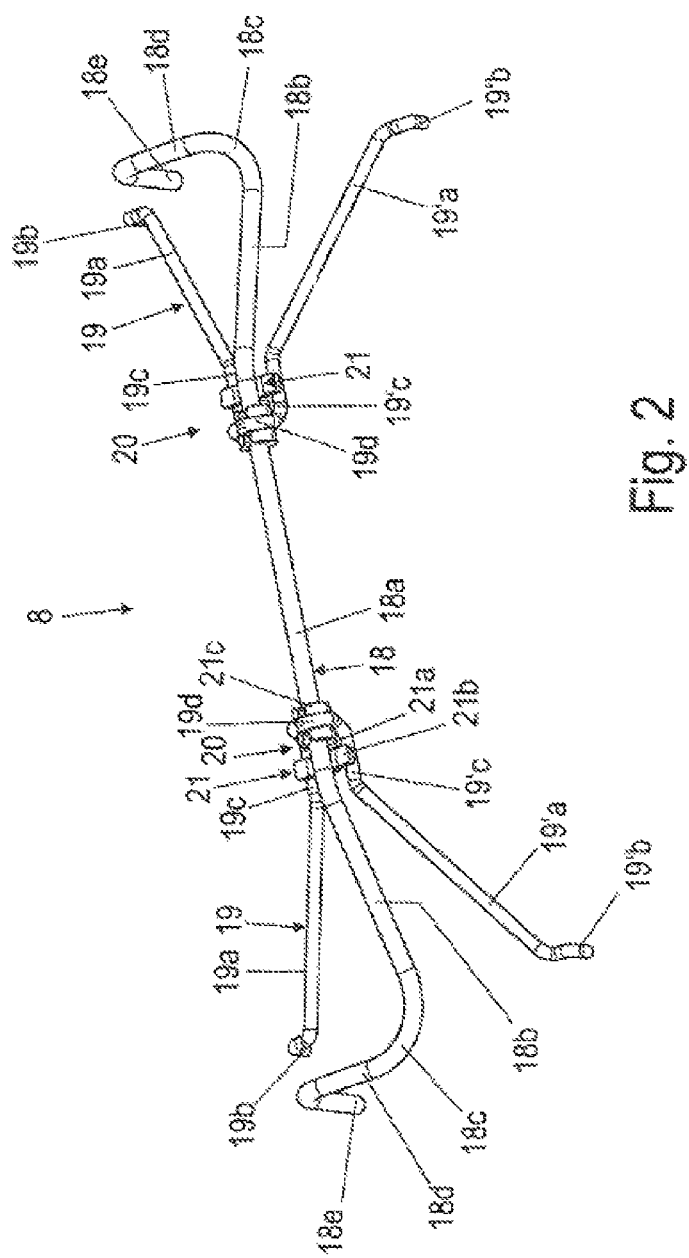
FIG. 2 shows an enlarged schematic perspective view of the spreading device according to FIG. 1.
Figure 3:
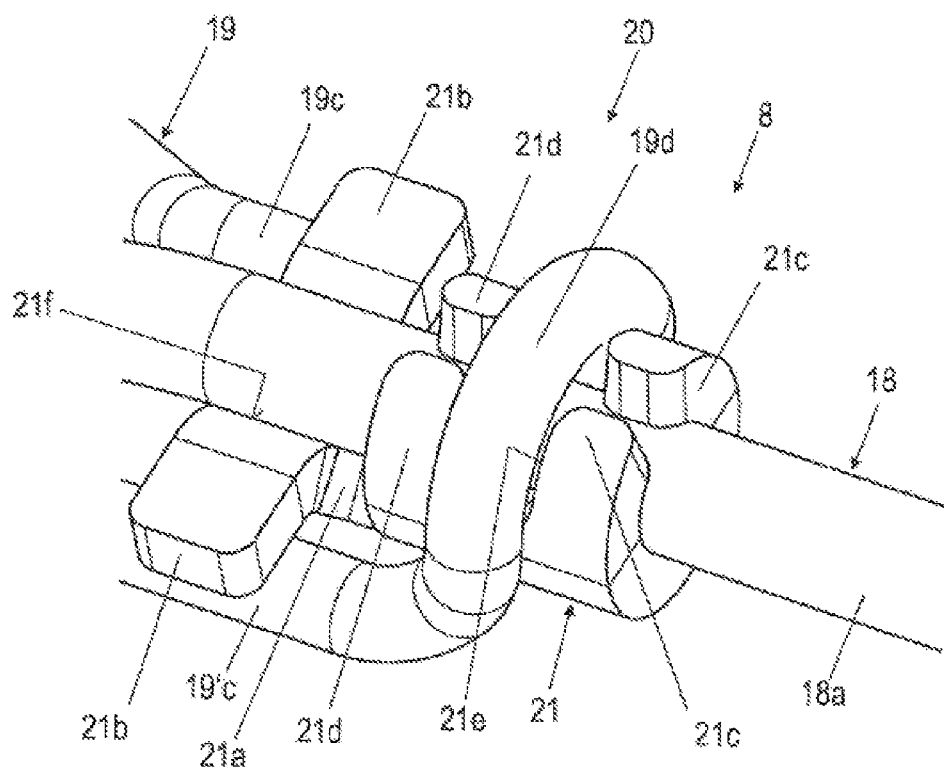
FIG. 3 shows an enlarged schematic perspective view of a connection interface of the spreading device according to FIG. 1.

FIG. 1 shows a detail of a disk brake 10 according to the invention with a first exemplary embodiment of a spreading device 8 according to the invention in a schematic perspective plan view. An enlarged schematic perspective view of the spreading device 8 according to FIG. 1 is illustrated in FIG. 2. FIG. 3 illustrates an enlarged schematic perspective view of a connection interface 20 of the spreading device 8 according to FIG. 1.

A brake caliper 1 engages over a brake disk 2 with a brake disk axis of rotation 2a. The brake caliper 1 is attached, displaceably relative to the brake disk 2 axially in the direction of the brake disk axis of rotation 2a, to a brake carrier 6, for which purpose the brake caliper 1 is mounted on guide beams (not illustrated) which are connected to the brake carrier 6 which is held in positionally static fashion on the vehicle.

The brake caliper 1 comprises an application section 11, a caliper rear section 12 and two tension struts 13. The application section 11 runs with one side parallel to the plane of the brake disk 2 on one side of the brake disk 2. The caliper rear section 12 is arranged on the other side of the brake disk 2, likewise so as to run parallel to the brake disk 2. The caliper rear section 12 is connected to the application section 11 at in each case one end by way of in each case one tension strut 13. Here, the tension struts 13 run substantially at right angles to the application section 11 and to the caliper rear section 12.

The application section 11 has an interior space in which an application device (not shown) of the disk brake 10 is arranged.

In this arrangement, the application section 11, the caliper rear section 12 and the tension struts 13 define, between them, a central opening 9 which extends over the brake disk 2. The opening 9 has an imaginary longitudinal central line which lies in the plane of the brake disk 2 and which connects the imaginary centers of the tension struts 13. Furthermore, the opening 9 has a further imaginary transverse central line which connects an imaginary center of the application section 11 to an imaginary center of the caliper rear section 12. The longitudinal central line and the transverse central line intersect at an imaginary center point, which in this case is referred to as the virtual center of the opening 9.

Brake pads 3, 3' are arranged in the brake carrier 6 in the so-called pad slots between the respective two brake carrier horns 17, 17'. The brake pads 3, 3' can, during a braking operation, be pressed against the brake disk 2 at both sides. Here, each brake pad 3, 3' has a pad carrier plate 4, 4' and, on the side facing toward the brake disk 2, a friction pad 5, 5' fastened to said pad carrier plate on a pad side 4a, which friction pad is, during the functional operation thereof, that is to say during a braking operation, pressed against the brake disk 2. The other side of the pad carrier plate 4, 4' will hereinafter be referred to as thrust side 4b.

The brake pads 3, 3' are accessible, for an exchange and for maintenance, through the central opening 9. Said brake pads can, through said central opening 9, be inserted into their associated pad slots and removed from said pad slots again.

A run-in side ES and, opposite, a run-out side AS of the disk brake 10 are defined in relation to a main direction of rotation of the brake disk 2.

A pad retaining clip 16 is arranged over the brake pads 3, 3' in a transverse direction of the opening 9 and, in the direction of the brake disk axis of rotation 2a, between the application section 11 and the caliper rear section 12. Here, the pad retaining clip 16 presses, by way of sections of its bottom side, against pad retaining springs 7, 7' of the brake pads 3, 3', whereby the latter are held in their pad slots. The pad retaining springs 7 are in each case held on the top sides of the pad carrier plates 4, 4' on projections.

Braking is performed by way of the application device arranged in a receiving space in the application section 11 of the brake caliper 1, which application device has, for example, a brake lever which is positioned in a dome of the brake caliper 1. The associated brake pad 3, referred to as action-side or application-side brake pad, is the first to make contact with the brake disk 2 during a braking operation. During the further course of the braking operation, reaction forces that occur cause the brake caliper 1 to be displaced in the opposite direction, driving the reaction-side brake pad 3' along until the latter likewise comes into frictional contact with the brake disk 2. The reaction-side brake pad 3' is also referred to as rear-side brake pad, and will hereinafter be distinguished from the application-side brake pad 3 by the reference sign 3'.

After a release of the brake, the two mutually opposite brake pads 3, 3' are, by way of the resetting device, released from the brake disk 2 to such an extent that said brake disk runs freely relative to the brake pads 3, 3'.

In unfavorable cases, the brake pads 3, 3' can, even after removal of the braking force, contact the brake disk 2 and thereby cause a residual rubbing torque.

In order to prevent a residual rubbing torque, use is made of a spring assembly which has, on the one hand, an attachment to a positionally static component (for example brake carrier 6) and, on the other hand, presses the brake pads 3, 3' away from the brake disk 2 via spring action.

Such a spring assembly is provided as a so-called spreading device 8.

Here, the spreading device 8 engages in the upper region of the pad carrier plates 4, 4' of the mutually opposite brake pads 3, 3' with equal action counter to the application direction. In this way, resetting forces are applied by the spreading device 8 to the brake pads 3, 3' in their upper regions.

The spreading device 8 comprises an attachment element 18, four spring arm units 19, 19' and two connection interfaces 20 each having a connection element 21.

The attachment element 18 is C-shaped, fastened in a positionally static manner to the brake carrier 6, specifically to brake carrier horns 17, and forms a holder for the spring arm units 19, 19'.

The spring arm units 19 are here formed as two identical pairs of spring arms 19a, 19'a which, by way of their one ends, are together connected via a connection interface 20 to the attachment element 18 by means of a connection element 21. The other ends of in each case one spring arm unit 19 interact, as attachment sections 19b, 19'b in attachment interfaces A1, A'1, A2, A'2, with brake pads 3, 3'. Here, spreading of the brake pads 3, 3' after a release of the brake is possible by way of the preload that is generated during the application movement.

The attachment element 18 and the spring arm units 19 here consist of a wire material having, for example, a circular cross section.

The attachment element 18 comprises a here rectilinearly extending central section 18*a* in a central region of the opening 9, approximately in a central plane of the brake disk 2. Adjoining the central section 18*a* on each side is a connection section 18*b* which is inclined downwardly with respect to the brake disk 2. Thus, the attachment element 18 extends from the center of the opening 9 on both sides in each case as far as a brake carrier horn 17 of the pad slot of the application-side brake pad 3.

Attached to each end of the connection sections 18*b* is a bow-shaped connection section 18*c* which is bent around through approximately 90° so as to be directed toward the respective brake carrier horn 17 and in each case merges into a further rectilinear connection section 18*d* which runs toward the respective brake carrier horn 17. These connection sections 18*d* then run parallel to one another and parallel to the brake disk axis 2*a* and are then bent over downwardly through approximately 90° into a respective fastening section 18*e*. Each fastening section 18*e* is fastened in a bore 17*a* of each brake carrier horn 17 and thus realizes the positionally static retention of the attachment element 18 with the spreading device 8 on the brake carrier 6.

Here, the attachment element 18 forms a centering device for the brake caliper 1 insofar as the brake carrier 6, to which the attachment element 18 is fastened, forms a positionally static part relative to which the brake caliper 1 is displaceably mounted, such that, after a release of the brake and a spreading movement of the spreading device 8, that is to say after the brake pads 3 have been pushed apart, the brake caliper 1 is guided into a centered position.

The two spring arms 19*a*, 19'*a* of each pair of the spring units 19, 19' are formed in mirror-image fashion with respect to the central section 18*a* of the attachment element 18, as can be clearly seen in FIG. 2.

The pairs of spring arms 19*a*, 19'*a* are arranged opposite one another in a transverse direction of the opening 9 such that they are fastened by way of inner ends, which point toward the center of the opening 9, to the attachment element 18 in each case via a connection interface 20 by means of a respective connection element 21, wherein their outer free ends interact with the pad carrier plates 4, 4' of the brake pads 3, 3'. Here, one pair of spring arms 19*a*, 19'*a* is arranged to the right of the central point of the opening 9, wherein the other pair of spring arms 19*a*, 19'*a* is arranged to the left of the central point of the opening 9.

The description of one spring unit 19, 19' applies to the other spring unit 19, 19' in mirror-image fashion, as clearly emerges from FIGS. 1 and 2.

Each spring arm 19*a*, 19'*a* has a rectilinear body with an inner end and an outer end. The inner ends are close to one another and point toward the center of the opening 9, wherein the outer ends are far away from one another and are each arranged over an end region of a pad carrier plate 4, 4'.

The inner ends of both spring arms 19*a*, 19'*a* are each provided with a rectilinear connection section 19*c*, 19'*c*. The connection sections 19*c*, 19'*c* run parallel to one another and parallel to a central plane of the brake disk 2, wherein they are connected via an upper connection bow 19*d*.

In this embodiment, the two spring arms 19*a*, 19'*a* are formed in one piece with the connection bow 19*d*, for example as a wire bent part. However, it is also possible that the spring arms 19*a*, 19'*a* are manufactured individually and then subsequently connected via an additional part which forms the connection bow 19*d*, for example by welding. Here, it can also be possible that in this case the connection sections 19*c*, 19'*c* and the connection bow 19*d* form the additional part.

The outer free end of each spring arm 19*a*, 19'*a* has a downwardly pointing attachment section 19*b*, 19'*b* for respectively interacting with the pad carrier plate 4, 4' in a respective attachment interface A1, A'1, A2, A'2.

In the exemplary embodiment shown in FIG. 1, the attachment sections 19*b*, 19'*b* are bent over downwardly and configured rectilinearly. Here, they are received in a form-fitting manner in receiving openings 4*c*, 4'*c* in top sides 4*d*, 4'*d* in corner regions of the respective pad rear plate 4, 4' of the brake pads 3, 3'. The receiving openings 4*c*, 4'*c* communicate with the shape of the attachment sections 19*b*, 19'*b* and are here configured as bores. The walls or the wall of a respective receiving opening 4*c*, 4'*c* form/forms a bearing surface for the respective attachment section 19*b*, 19'*b*. The receiving openings 4*c*, 4'*c* can take the form of blind holes and/or of through-holes, for example. The receiving openings 4*c*, 4'*c* can have different cross sections, thus being, for example, round, circular, oval or angular, wherein the cross sections of the attachment sections 19*b*, 19'*b*, which are received in them, of the spring arms 19*a*, 19'*a* communicate with the respective cross section of the receiving openings 4*c*, 4'*c*. However, it is also possible that round attachment sections 19*b*, 19'*b* can be inserted into angular or oval receiving openings 4*c*, 4'*c*.

If the receiving openings 4*c*, 4'*c* take the form of blind holes, the ends of the attachment sections 19*b*, 19'*b* can lie on the respective bottom of a blind hole, which can form a bearing surface.

The inner ends of the connection sections 19*c*, 19'*c* and the connection bow 19*d* connecting them are connected to a respective connection element 21. The connection elements 21 each form a connection interface 20 between the respective spring units 19, 19' and the positionally static attachment element 18. This is shown on an enlarged scale in FIG. 3.

The connection element 21 comprises a longitudinally extending base section 21*a*, two mutually opposite wing sections 21*b*, 21'*b* and two mutually opposite pairs of sleeve sections 21*c*, 21'*c*; 21*d*, 21'*d*.

In the installed state of the spreading device 8, as shown in FIG. 1, the base section 21*a* extends in the longitudinal direction of the opening 9. The wing sections 21*b*, 21'*b* are attached to an outer end of the base section 21*a* that points away from the center of the opening 9. Each wing section 21*b*, 21'*b* forms, on each longitudinal side of the base section 21*a*, a lug which projects from the base section 21*a* at a right angle to the longitudinal direction thereof.

At the other end, the inner end, of the base section 21*a*, the sleeve sections 21*c*, 21'*c*; 21*d*, 21'*d* are integrally formed on both sides, extend upwardly and are bent around the central section 18*a* of the attachment element 18.

The base section 21*a* is adapted to the round outer shape of the central section 18*a* of the attachment element 18, wherein, in the installed state, the central section 18*a* is arranged so as to extend on the base section 21*a* in its longitudinal direction. Here, the central section 18*a* lies between the wing sections 21*b*, 21'*b* on a bearing section 21*f* of the base section 21*a* and within the sleeve sections 21*c*, 21'*c*; 21*d*, 21'*d* on the base section 21*a*.

The associated spring unit 19, 19' is connected to the connection element 21 in such a way that the two connection sections 21*c*, 21'*c* extend parallel to the base section 21*a* of the connection element 21, below in each case a wing section 21b, 21'b, wherein the inner ends of the two connection sections 19c, 19'c are each upwardly bent in a 90° arc and then merge into the connection bow 19d. Here, the connection bow 19d extends between the sleeve sections 21c, 21'c; 21d, 21'd and is arranged within axial interspaces 21e, 21'e. In this way, the connection element 21 is connected to the spring unit 19, 19', wherein at the same time a connection is formed with the central section 18a of the attachment element 18, which extends, on the one hand, parallel to the connection sections 19c, 19'c of the spring unit 19, 19' on the base section 21a and, on the other hand, further through the sleeve sections 21c, 21'c; 21d, 21'd and below the connection bow 19d of the spring unit 19, 19'.

In this way, in each connection interface 20, a spring unit 19, 19' is, by way of the respective two spring arms 19a, 19'a, mounted on the central section 18a of the attachment element 18 so as to be not only axially displaceable in the longitudinal direction of the central section 18a of the attachment element 18 but also to be rotatable.

In other words, the spring units 19, 19' can move independently of one another in the axial direction of the longitudinal axis of the central section 18a of the attachment section 18 and at the same time rotate independently of one another about the longitudinal axis of the central section 18a. The spreading device is thus particularly flexible and adaptable. However, for simpler assemblability, a fixing of the rotatability can also be envisioned.

As a result of the increasing wear of the friction material, that is to say of the friction pads 5, 5' of the brake pads 3, 3' and also of the brake disk 2, the attachment of the spring arms 19a, 19'a must have a degree of freedom. This degree of freedom serves to prevent multiaxial distortion/tilting of the system. For this purpose, the attachment of the spring elements in the form of the spring arms 19a, 19'a by means of the connection interfaces 20 to the positionally static attachment element 18 is configured to be displaceable. The compensation for the friction material wear can thus be realized by an axial sliding movement of the spring arm attachment in the connection interfaces 20 with respect to the positionally static attachment element 18.

The assembly of the complete spreading device 8 (centering unit) is designed such that a certain play is provided at the connection interfaces 20 between the resilient spring units 19, 19 and the attachment element 8 (positionally static component). With progressive tightening of the spring units 19, 19', the connection interfaces 20 are displaced in the direction of the center of the opening 9 of the disk brake 10 (toward the pad retaining clip 16) as a result of this play.

The attachment of the spring units 19, 19' is effected via the respective connection element 21. By way of example, the connection element 21 can be a compressed sheet metal element. However, it can vary in its construction. A displacement in the axial direction of the wire clip is possible.

The vibrations which occur during the travel of a vehicle which has the disk brake 10 facilitate a displacement of the connection interfaces 20, with the result that correct functioning can also be assumed in the case of contamination.

Figure 4:
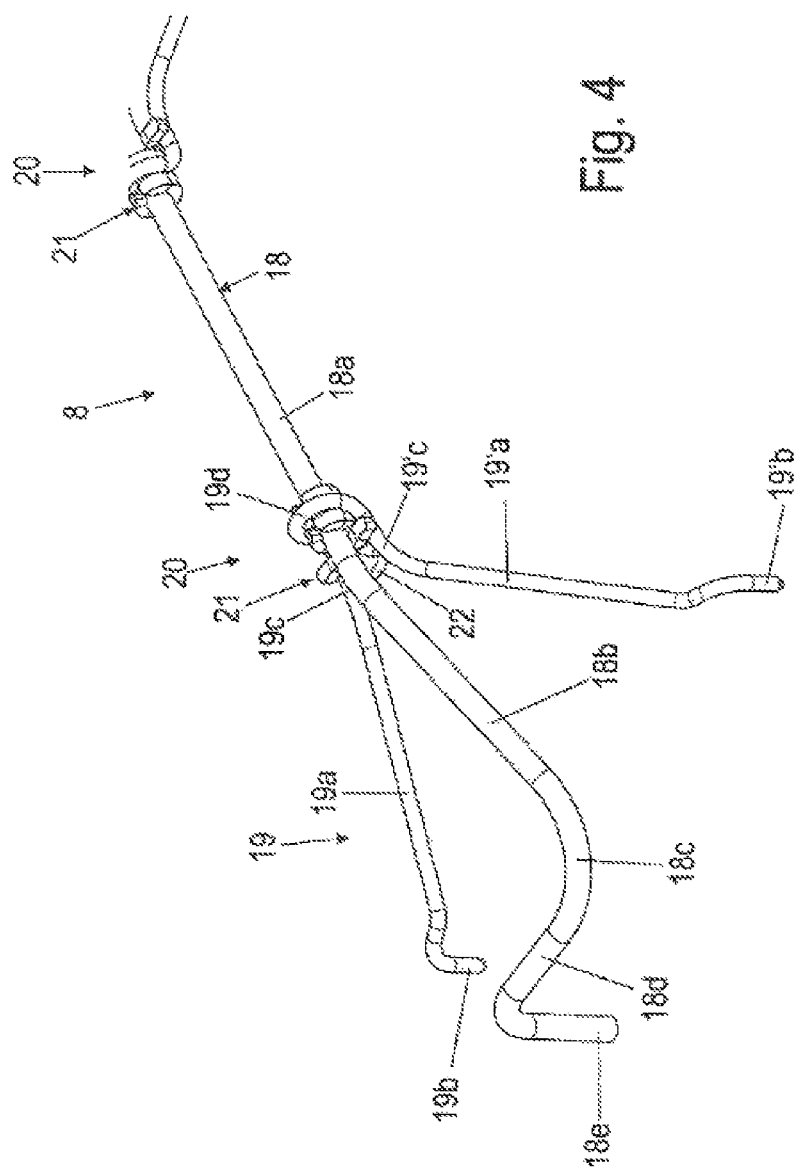
FIGS. 4-6 show further schematic perspective illustrations of the spreading device according to FIG. 1 with a first variant of the connection interface.
Figure 5:
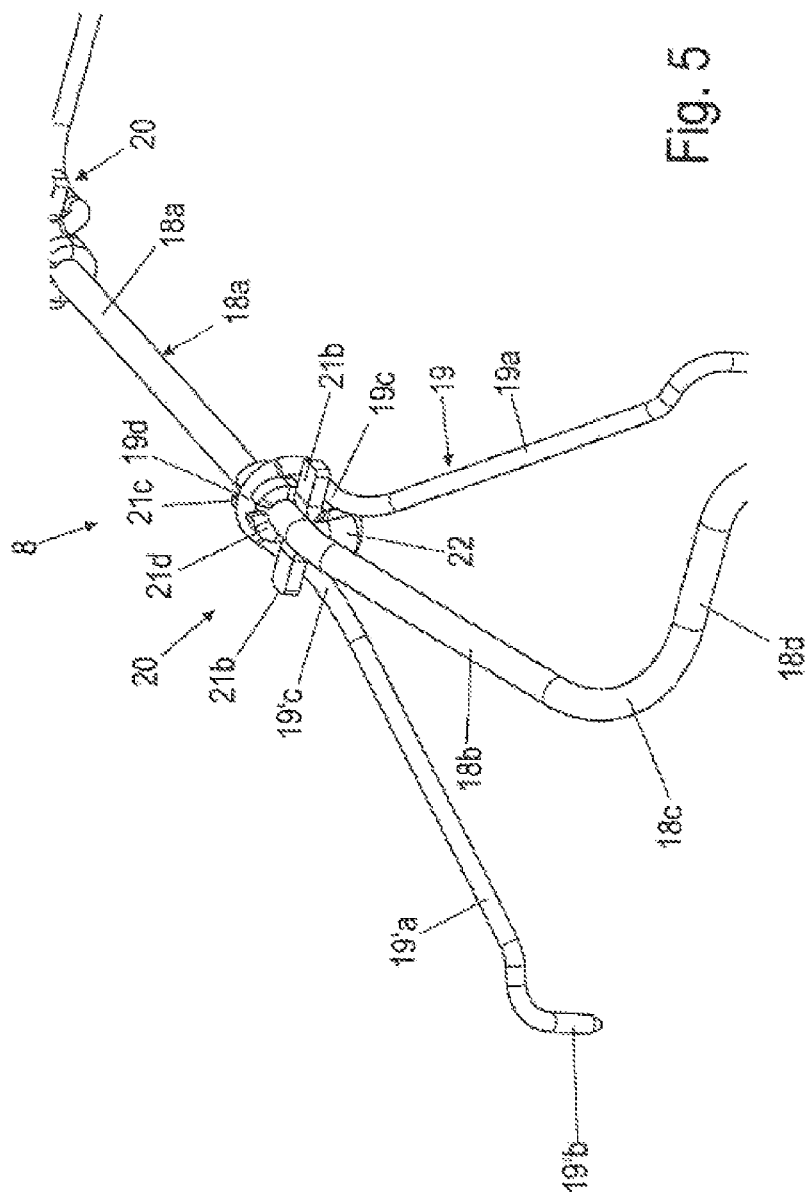
Figure 6:
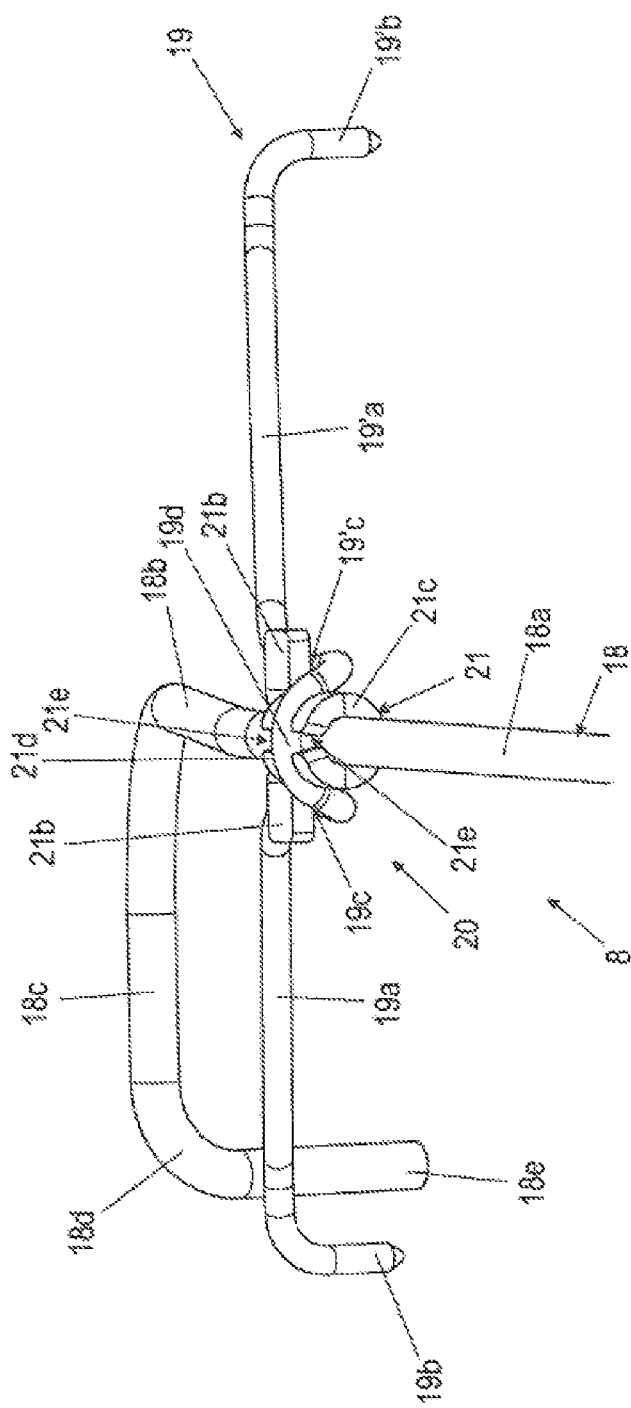
Figure 7:
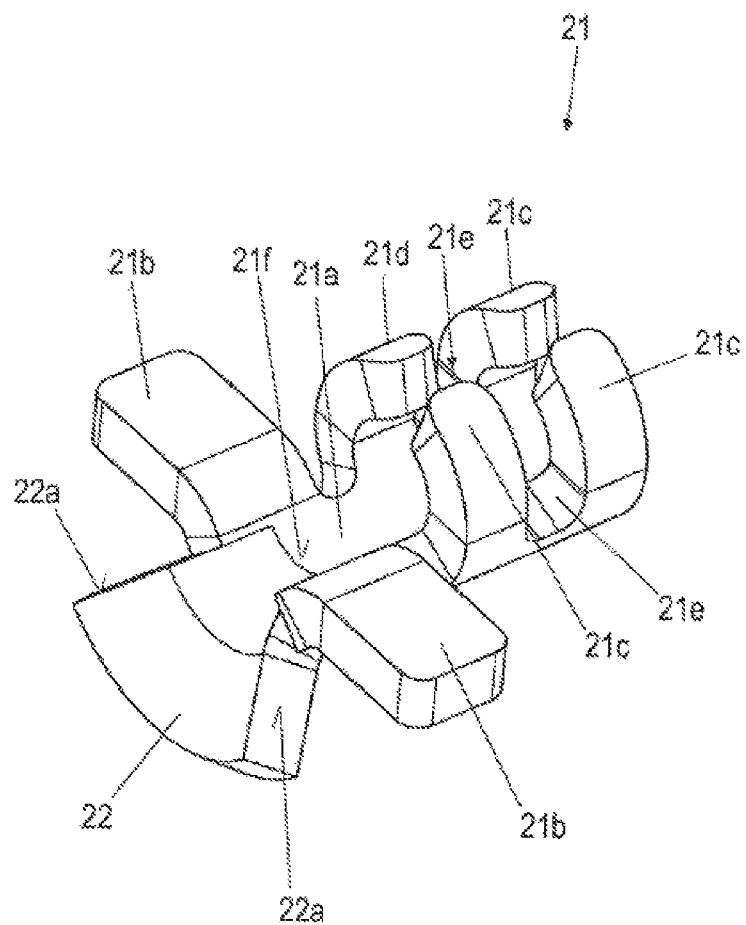
FIG. 7 shows an enlarged schematic perspective view of the variant of the connection interface of the spreading device according to FIGS. 4-6.

FIGS. 4-6 show further schematic perspective illustrations of the spreading device 8 according to FIG. 1 with a first variant of the connection interface 20. FIG. 7 illustrates an enlarged schematic perspective view of the variant of the connection interface 20 of the spreading device 8 according to FIGS. 4-6.

The first variant of the connection interface 20 consists in a downwardly bent-over spacer section 22 being attached to the outer end of the connection element 21. The connection sections 19c, 19'c of the spring units 19, 19' bear against lateral sections 22a of the spacer section 22.

The associated connection element 21 is shown in FIG. 7.

Figure 8:
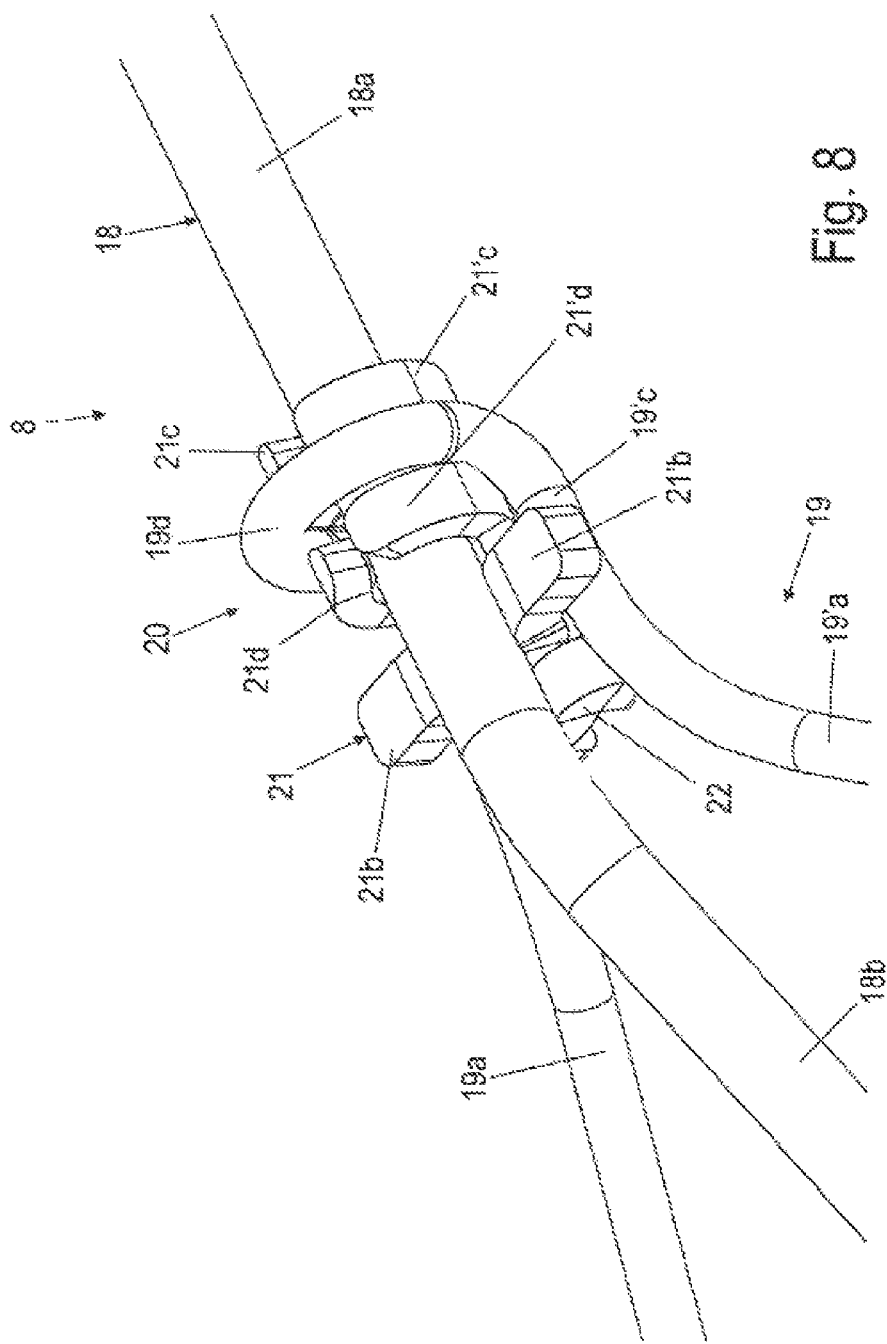
FIGS. 8-9 show enlarged schematic perspective partial illustrations of the spreading device according to FIG. 1 with a second variant of the connection interface.
Figure 9:
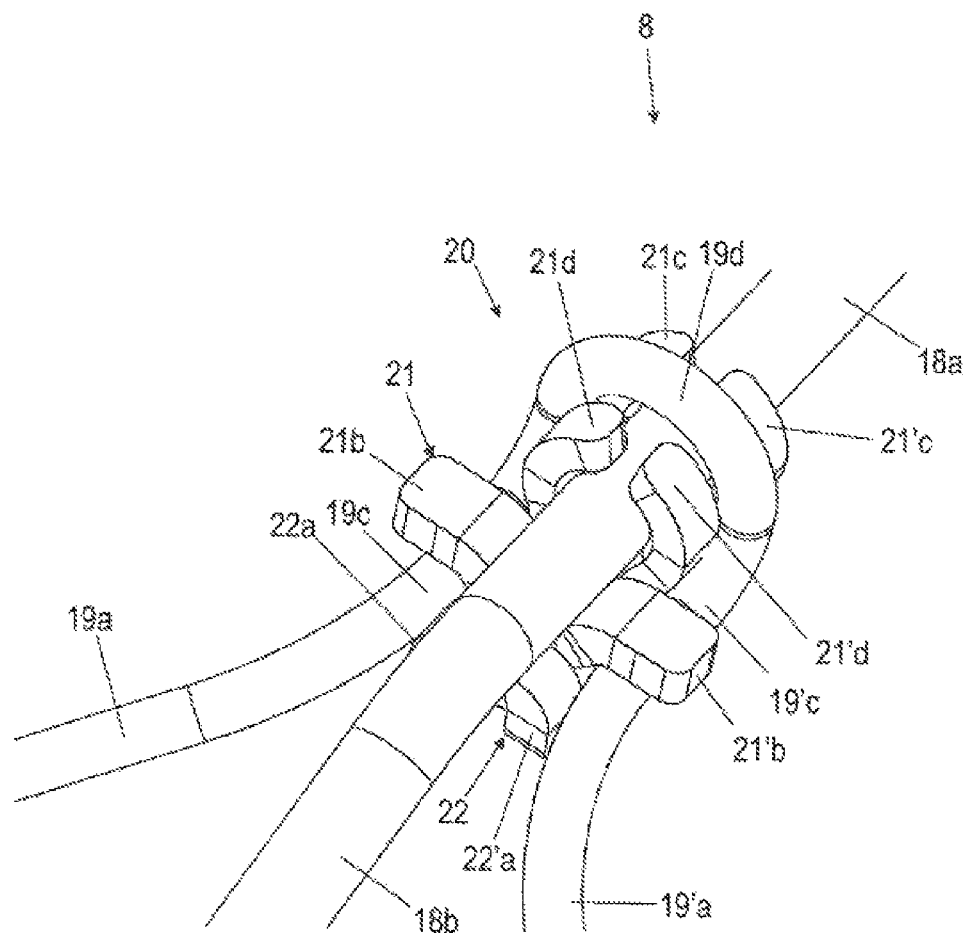
Figure 10:
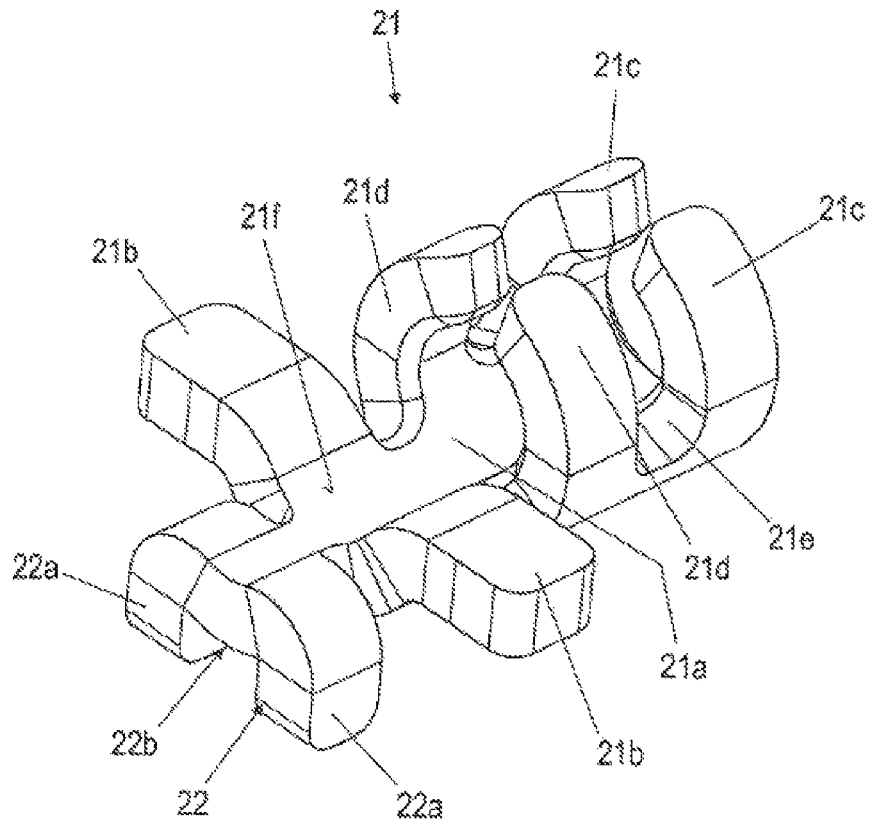
FIG. 10 shows an enlarged schematic perspective view of the second variant of the connection interface of the spreading device according to FIGS. 8-9.

FIGS. 8-9 illustrate enlarged schematic perspective partial illustrations of the spreading device 8 according to FIG. 1 with a second variant of the connection interface 20 with a slightly modified connection element 21. Here, the spacer section 22 is provided with a central recess 22a, as can clearly be seen in FIG. 10 in an enlarged schematic perspective view of the second variant of the connection interface 20 of the spreading device 21 according to FIGS. 8-9.

Figure 11:
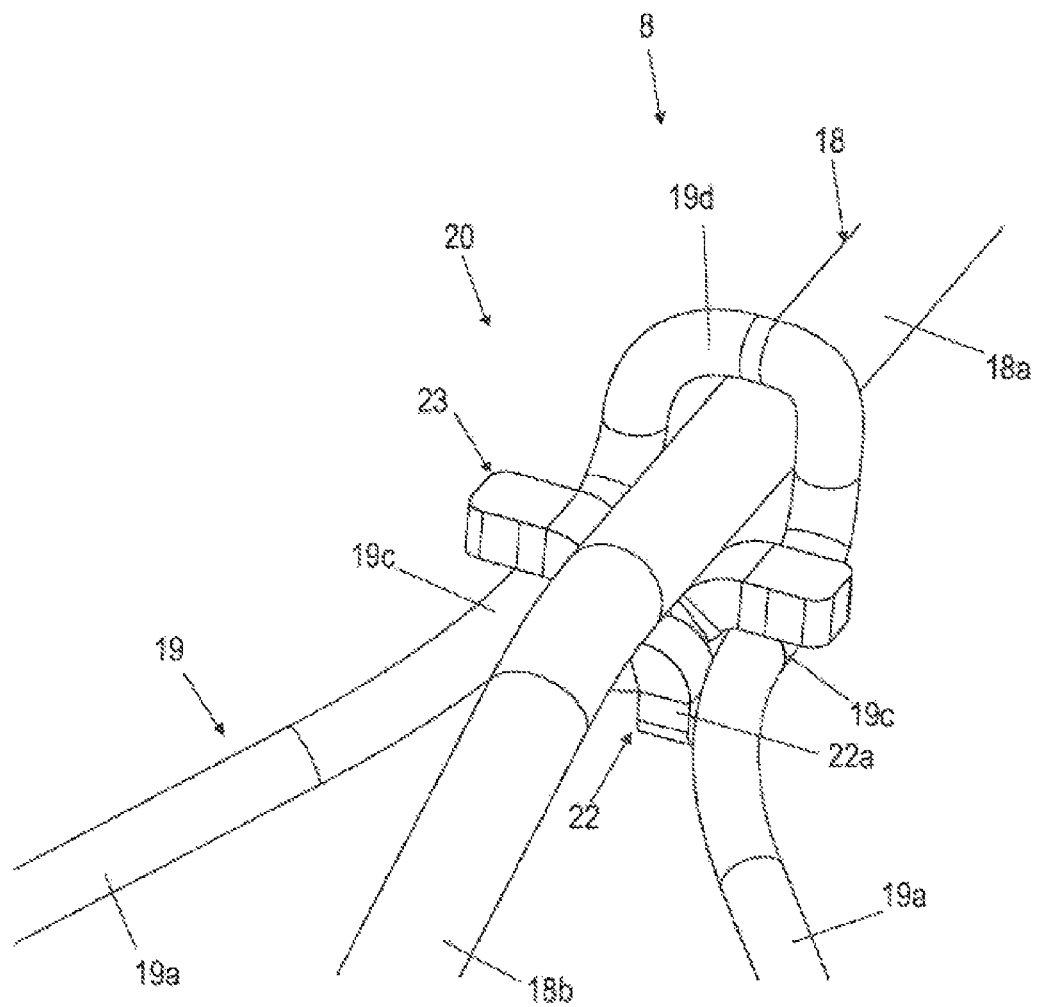
FIG. 11 shows an enlarged schematic perspective partial illustration of the spreading device according to FIG. 1 with a third variant of the connection interface.
Figure 12:
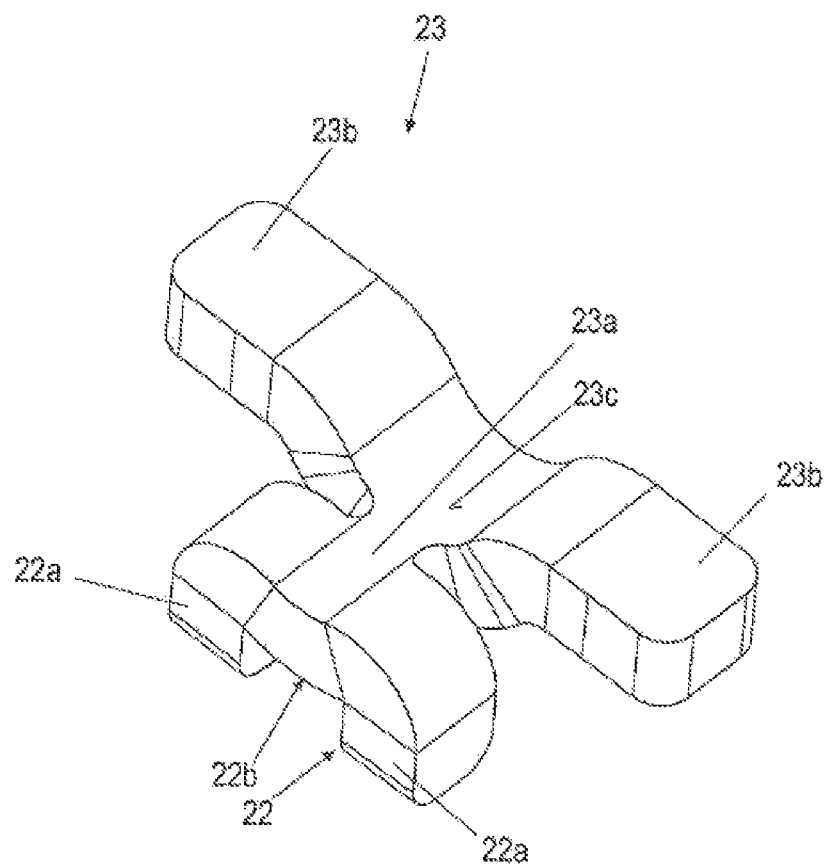
FIG. 12 shows an enlarged schematic perspective view of the third variant of the connection interface of the spreading device according to FIG. 11.

FIG. 11 shows an enlarged schematic perspective partial illustration of the spreading device according to FIG. 1 with a third variant of the connection interface 20. The associated connection element 23, which is here reduced in its form, is shown in FIG. 12 in an enlarged schematic perspective view of the third variant of the connection interface 20 of the spreading device 8 according to FIG. 11.

Figure 13:
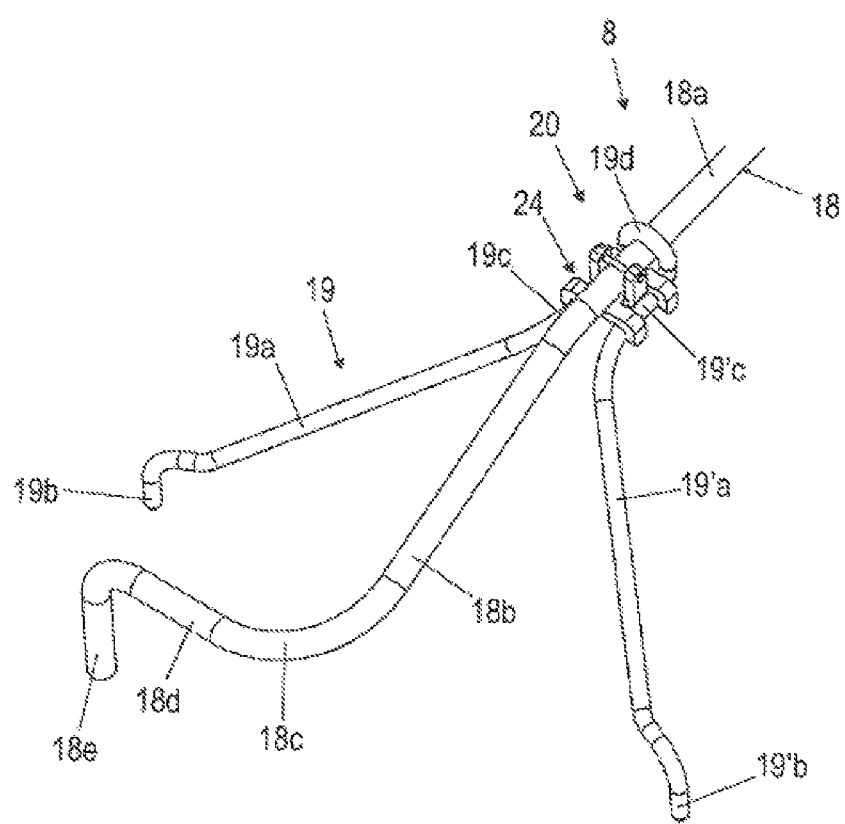
FIGS. 13-14 show enlarged schematic perspective partial illustrations of the spreading device according to FIG. 1 with a fourth variant of the connection interface.
Figure 14:
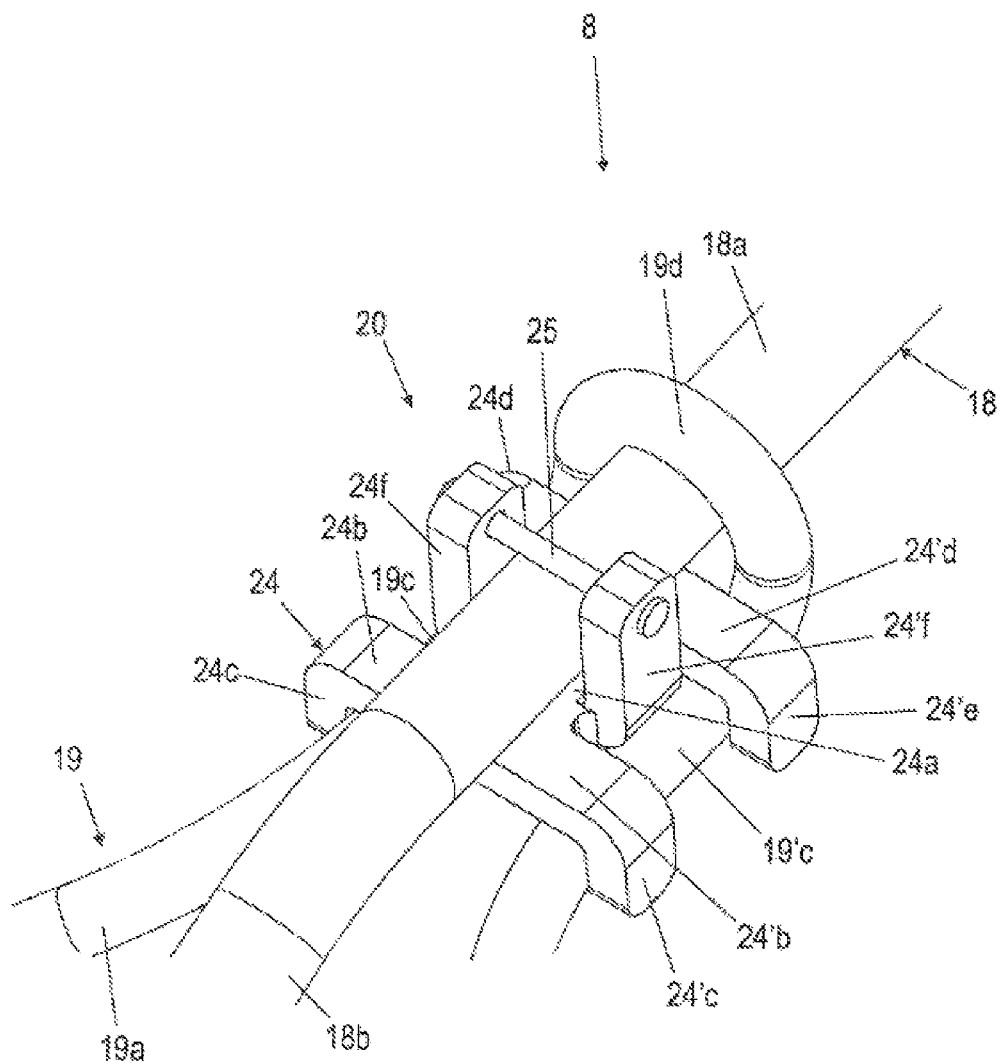

FIGS. 13 and 14 illustrate enlarged schematic perspective partial illustrations of the spreading device 8 according to FIG. 1 with a fourth variant of the connection interface 20 with a connection element 24. Here, four wing sections 24b, 24'b; 24d, 24'd are provided, wherein a guide section is provided as a fork guide 24f, 24'f with a pin 25 for securing.

Figure 15:
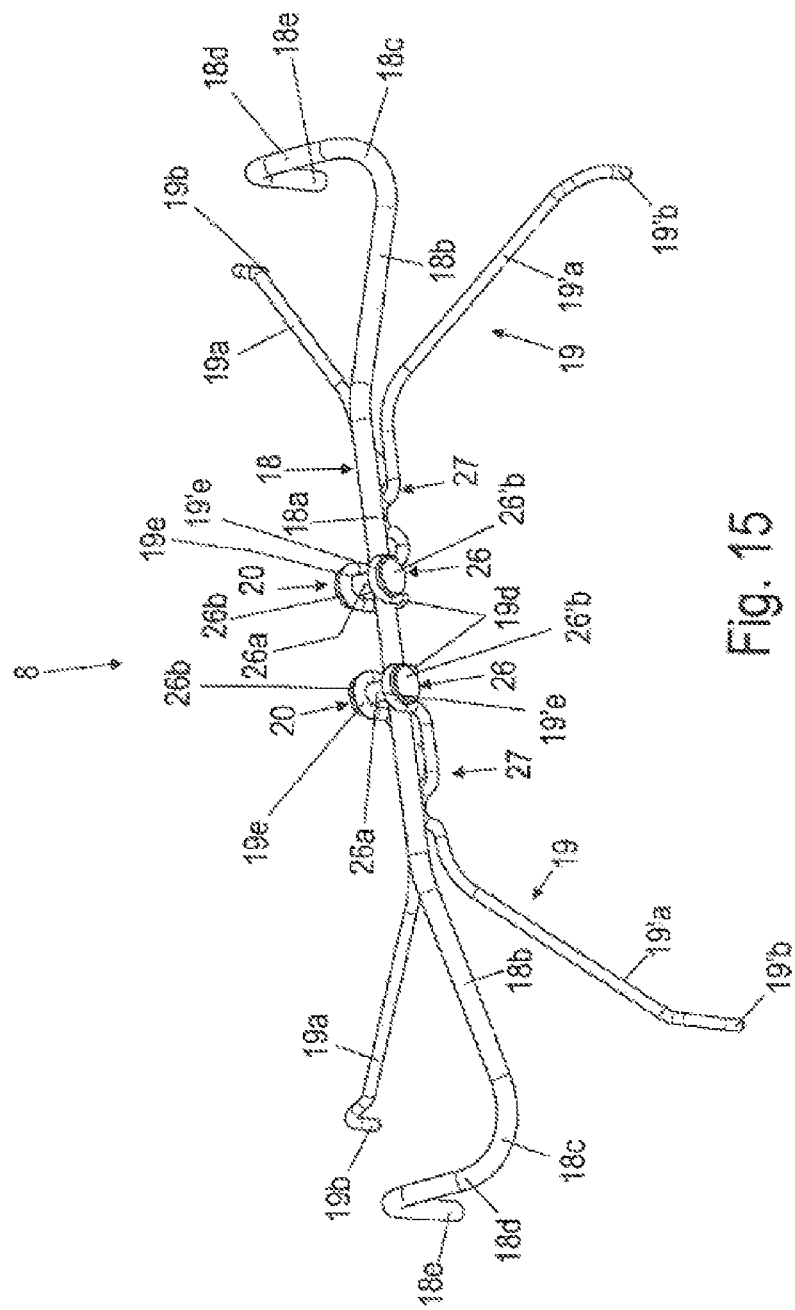
FIGS. 15-16 show enlarged schematic perspective views of a first variant of the spreading device according to FIG. 1 with a fifth variant of the connection interface.
Figure 16:
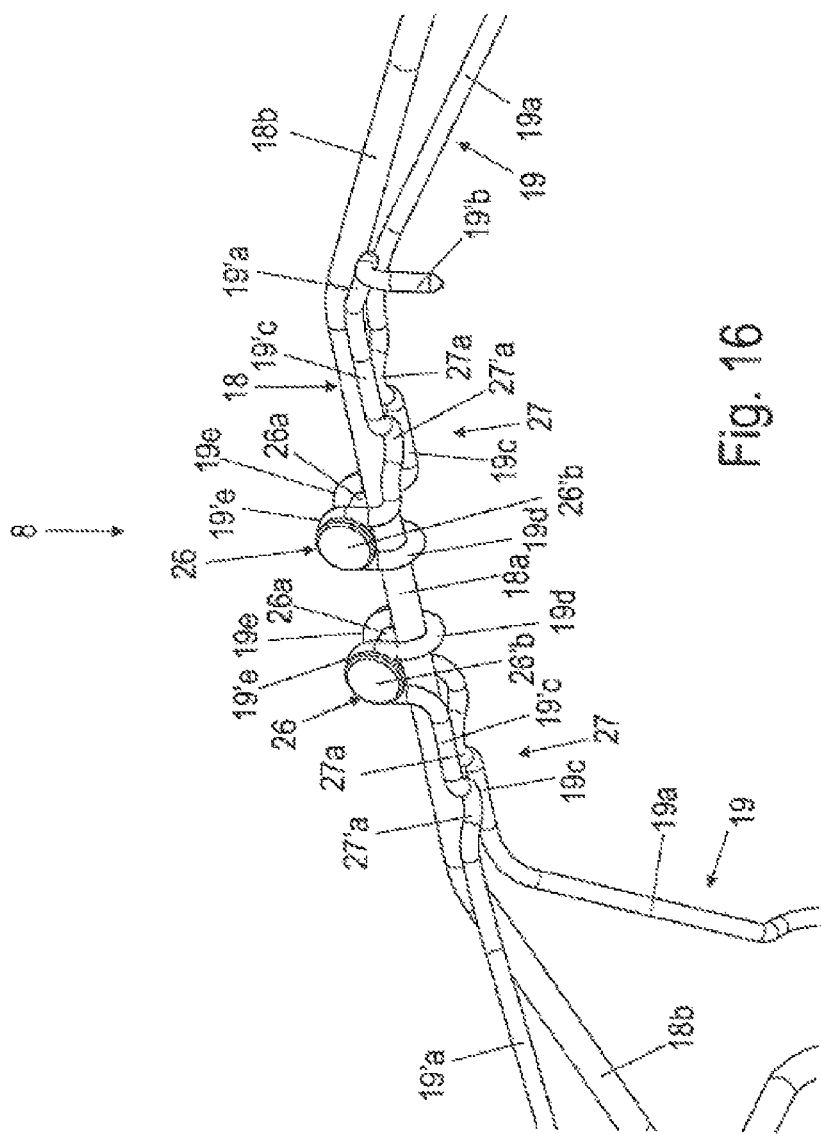
Figure 17:
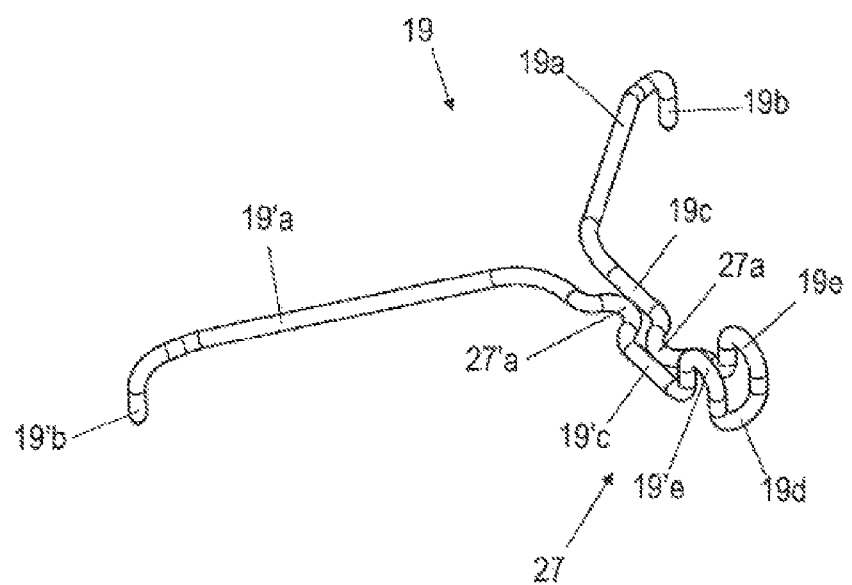
FIG. 17 shows an enlarged schematic perspective view of a spring arm unit of the first variant of the spreading device according to FIGS. 15-16.

FIGS. 15-16 show enlarged schematic perspective views of a first variant of the spreading device 8 according to FIG. 1 with a fifth variant of the connection interface 8. FIG. 17 shows an enlarged schematic perspective view of a spring arm unit 19 of the first variant of the spreading device 8 according to FIGS. 15-16.

In this variant, guide elements 26 with pins 26a are received in bow sections 19e, 19'e of the spring units. Here, the connection sections 19c, 19'c are each provided as supporting sections 27 with bow sections 27a, 27'a in a horizontal plane. The central section 18a of the attachment element 18 is arranged here on the supporting sections 27 and is held by the pins 26a of the guide elements 26 on the supporting sections 27.

Figure 18:
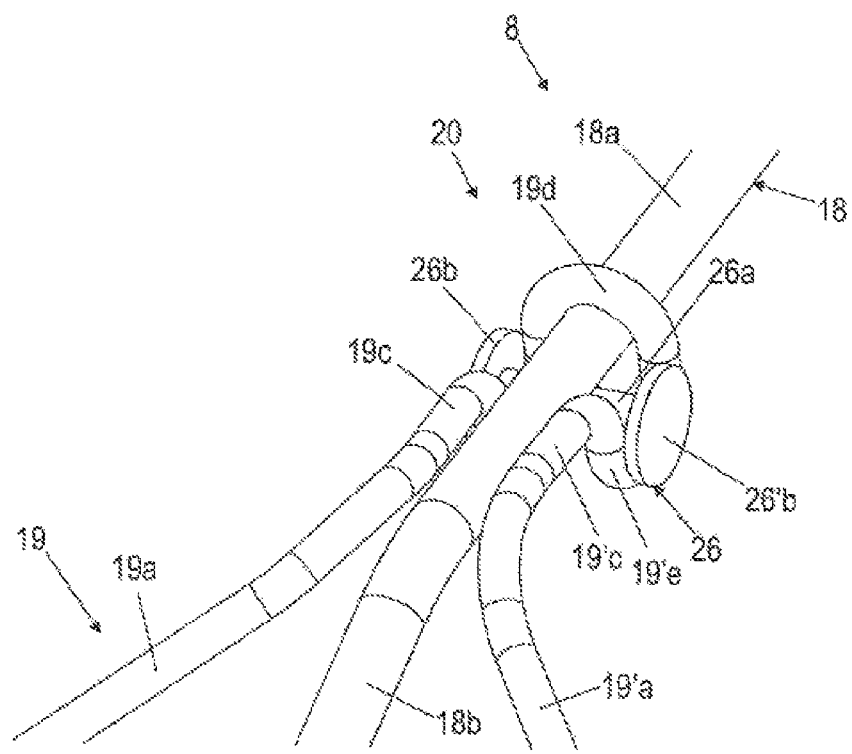
FIG. 18 shows an enlarged schematic partial perspective view of a second variant of the spreading device according to FIG. 1 with a sixth variant of the connection interface.

FIG. 18 shows an enlarged schematic partial perspective view of a second variant of the spreading device 8 according to FIG. 1 with a sixth variant of the connection interface 20 with a connection element 26. The connection element 26 is structurally similar to that of the fifth variant, but, unlike the latter, is arranged below the central section 18a of the attachment element 18. Here, the central section 18a runs on the pin 26a of the guide element 26 and extends through the connection bow 19d of the spring unit 19, 19'.

Figure 19:
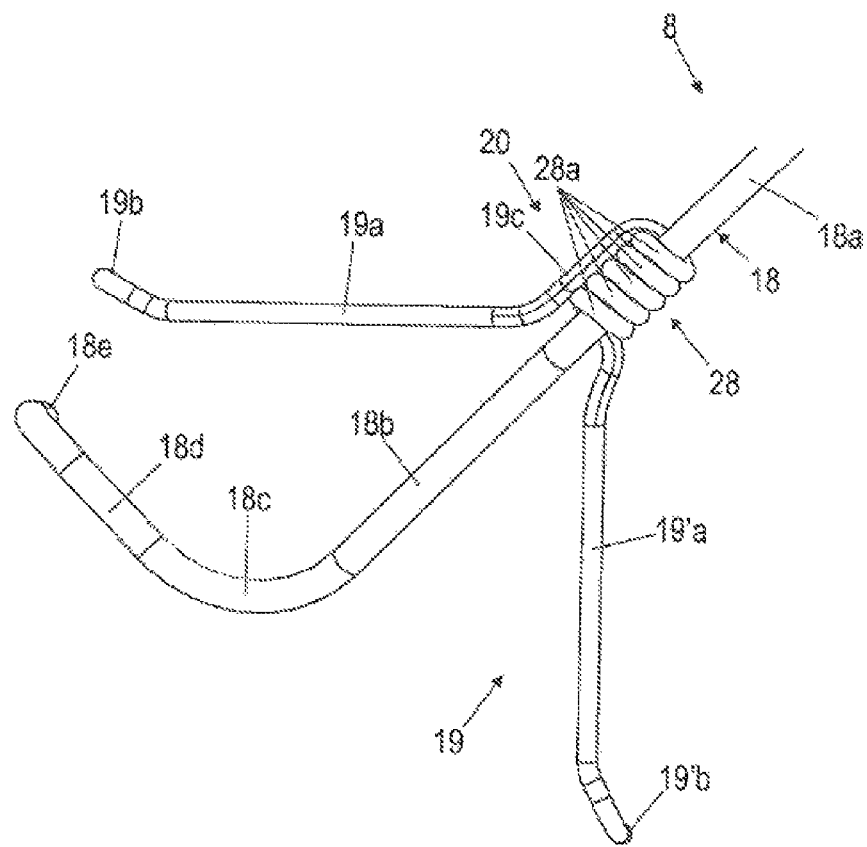
FIG. 19 shows an enlarged schematic partial perspective view of a third variant of the spreading device according to FIG. 1 with a seventh variant of the connection interface.
Figure 20:
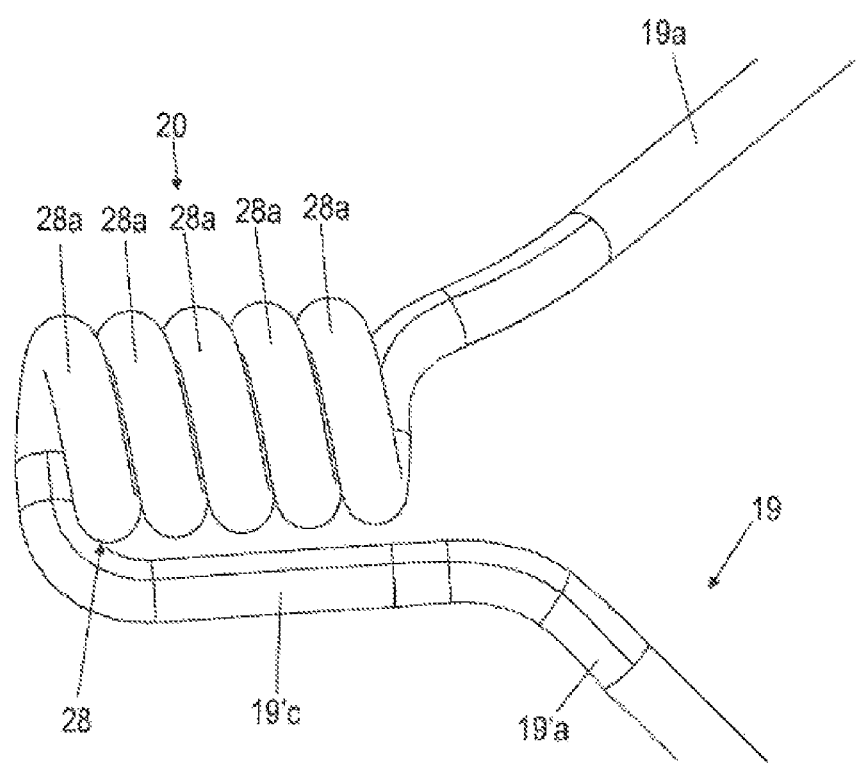
FIG. 20 shows an enlarged perspective view of the seventh variant of the connection interface of the third variant of the spreading device according to FIG. 19.

FIG. 19 shows an enlarged schematic partial perspective view of a third variant of the spreading device 8 according to FIG. 1 with a seventh variant of the connection interface 20. FIG. 20 shows an enlarged perspective view of the seventh variant of the connection interface 20 of the third variant of the spreading device according to FIG. 19. Here, a connection element 28 is formed as a guide section by windings 28a of the connection sections 19c, 19'c around the central section 18a of the attachment element 18. The connection element 28 is here formed in the manner of a coil.

In this way, in this seventh variant, the spring arms 19a, 19'a are formed in one piece together with the connection element 28. In other words, the connection element 28 of the connection interface 20 is formed in one piece with the spring arms 19a, 19'a. Here, too, it is conceivable for the spring arms 19a, 19'a to be produced separately, wherein the connection element 28 is subsequently connected as an additional part to the spring arms 19*a*, 19'*a*, for example by welding.

Figure 21:
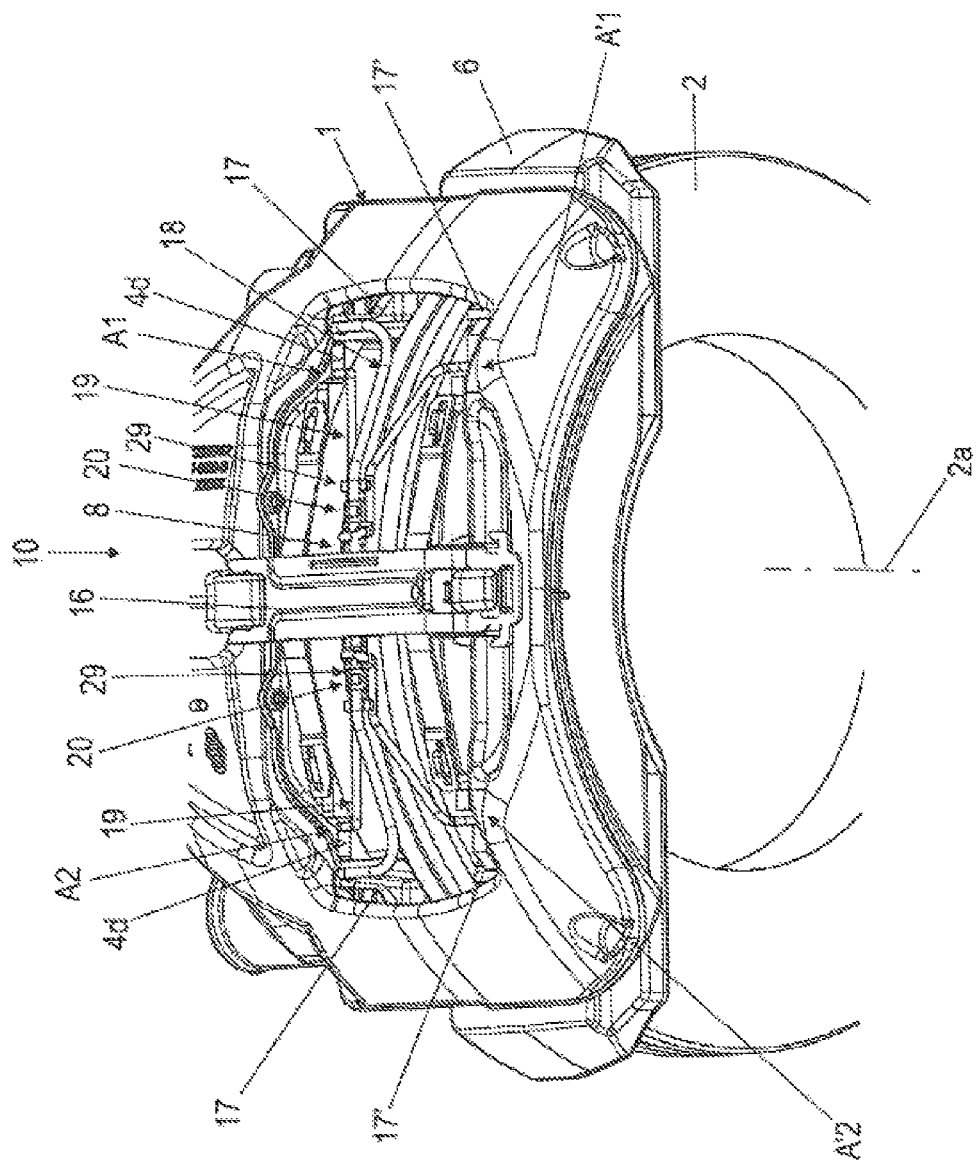
FIGS. 21-22 show details of the disk brake according to the invention with the spreading device according to the invention according to FIG. 1 with an eighth variant of the connection interface.
Figure 22:
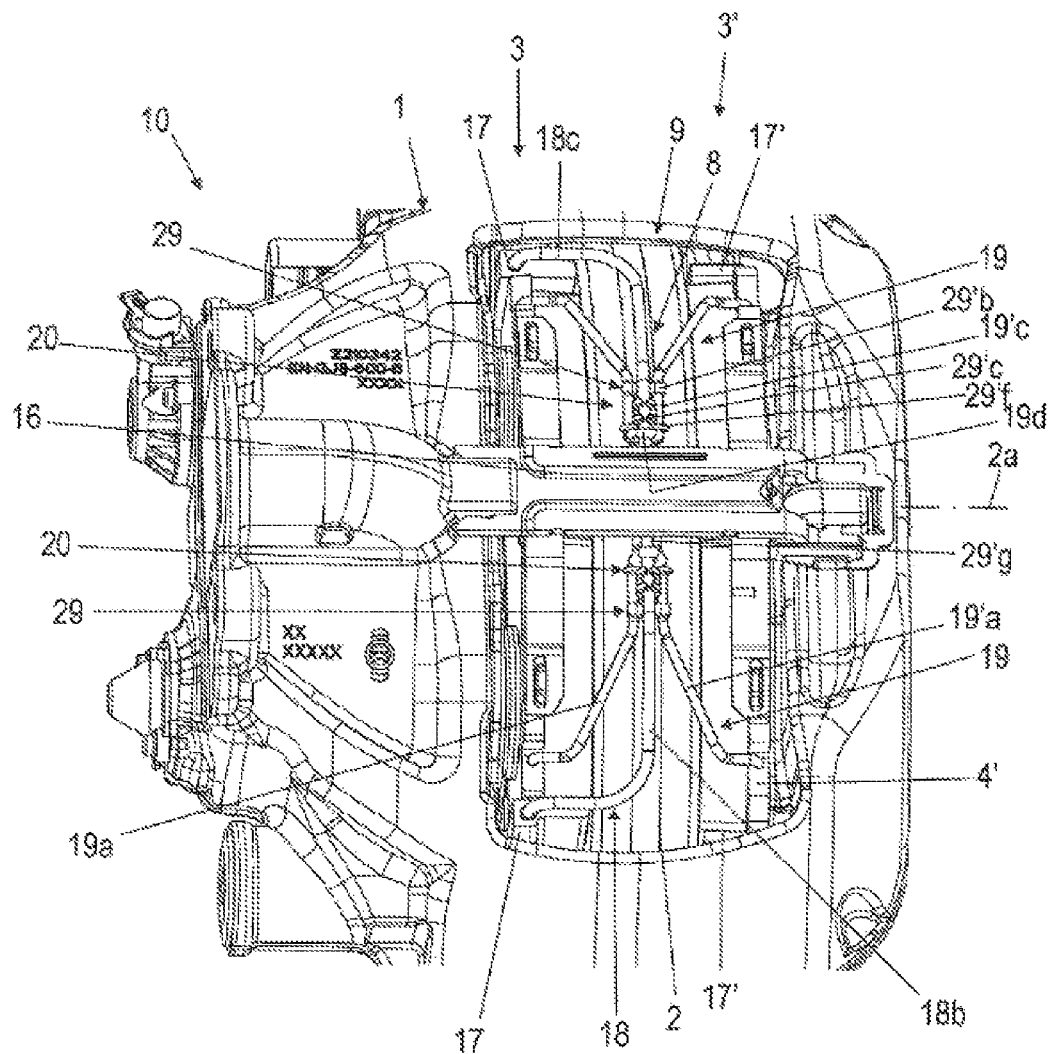

FIGS. 21-22 illustrate details of the disk brake 10 according to the invention with the spreading device 8 according to the invention according to FIG. 1 with an eighth variant of the connection interface 20.

Figure 28:
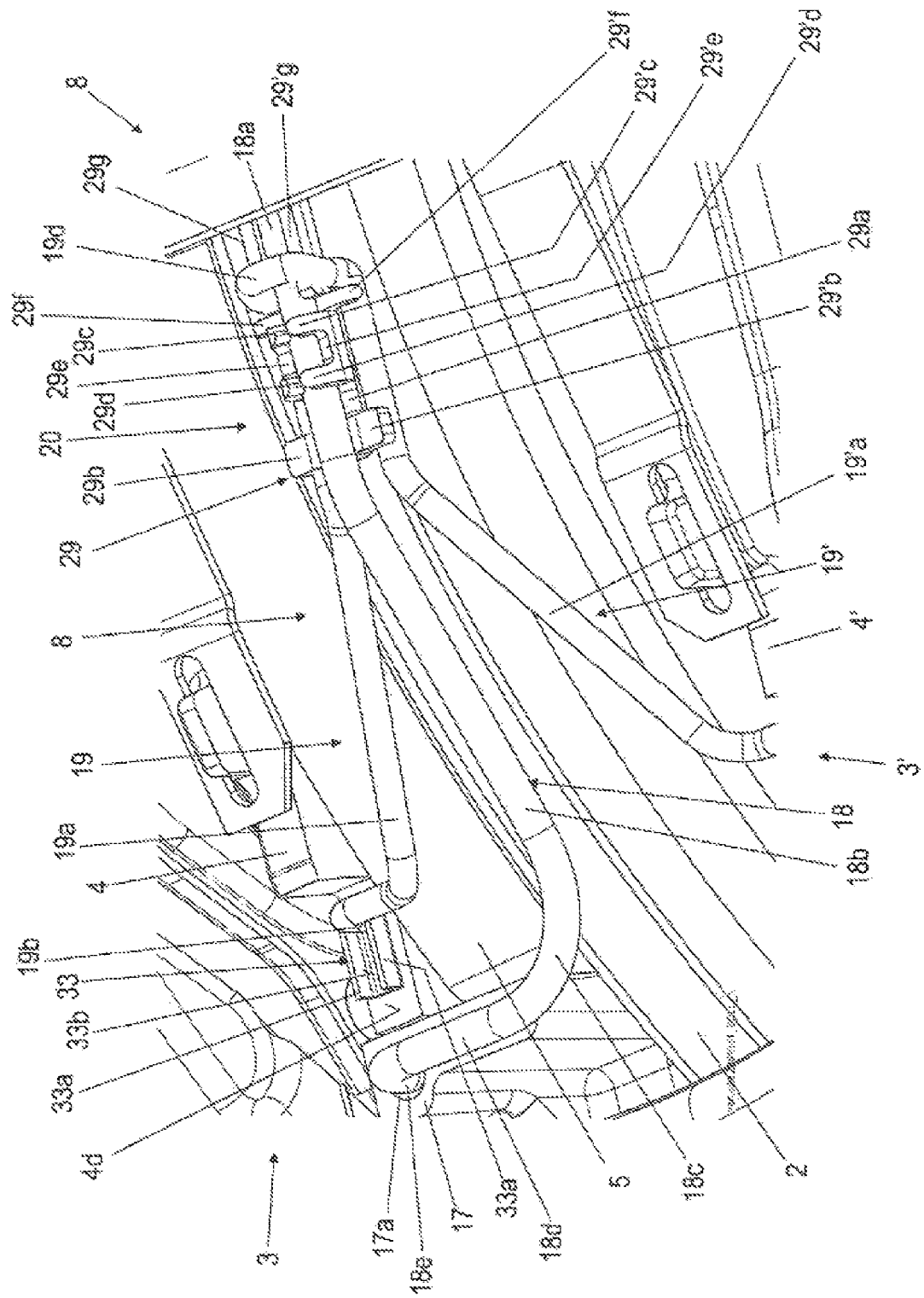
FIG. 28 shows the disk brake according to the invention according to FIGS. 21-22 with a third variant of attachment interfaces.

The connection interfaces 20 here have two connection elements 29 which are connected by a common base section 29*a*. The connection element 29 is best shown in FIG. 28 and has the already above-described wing sections 29*b*, 29'*b* and sleeve sections 29*c*, 29'*c*; 29*d*, 29'*d* with interspaces 29*e*, 29'*e*. In addition, still further wing sections 29*f*, 29'*f* are attached to the base section 29*a* between the sleeve sections 29*c*, 29'*c*; 29*d*, 29'*d* and a connection region of the base section 29*a*. Unlike the connection interface 20 according to FIG. 1, the connection bow is arranged not in the sleeve sections 29*c*, 29'*c*; 29*d*, 29'*d* but over the ends of guide sections 29*g*, 29'*g*. The connection region of the base section 29*a* is provided with the longitudinally extending, upwardly bent-over guide sections 29*g*, 29'*g*. The central section 18*a* of the attachment element 18 lies on the connection region of the base section 29*a* between the two lateral sections 29*g*, 29'*g*.

The attachment interfaces A1, A'1, A2, A'2 are configured with receiving openings 4*c*, 4'*c* as in the exemplary embodiment according to FIG. 1, but, by contrast thereto, are offset further toward the center on the top side 4*d*, 4'*d* of the respective pad rear plate 4, 4'.

Figure 23:
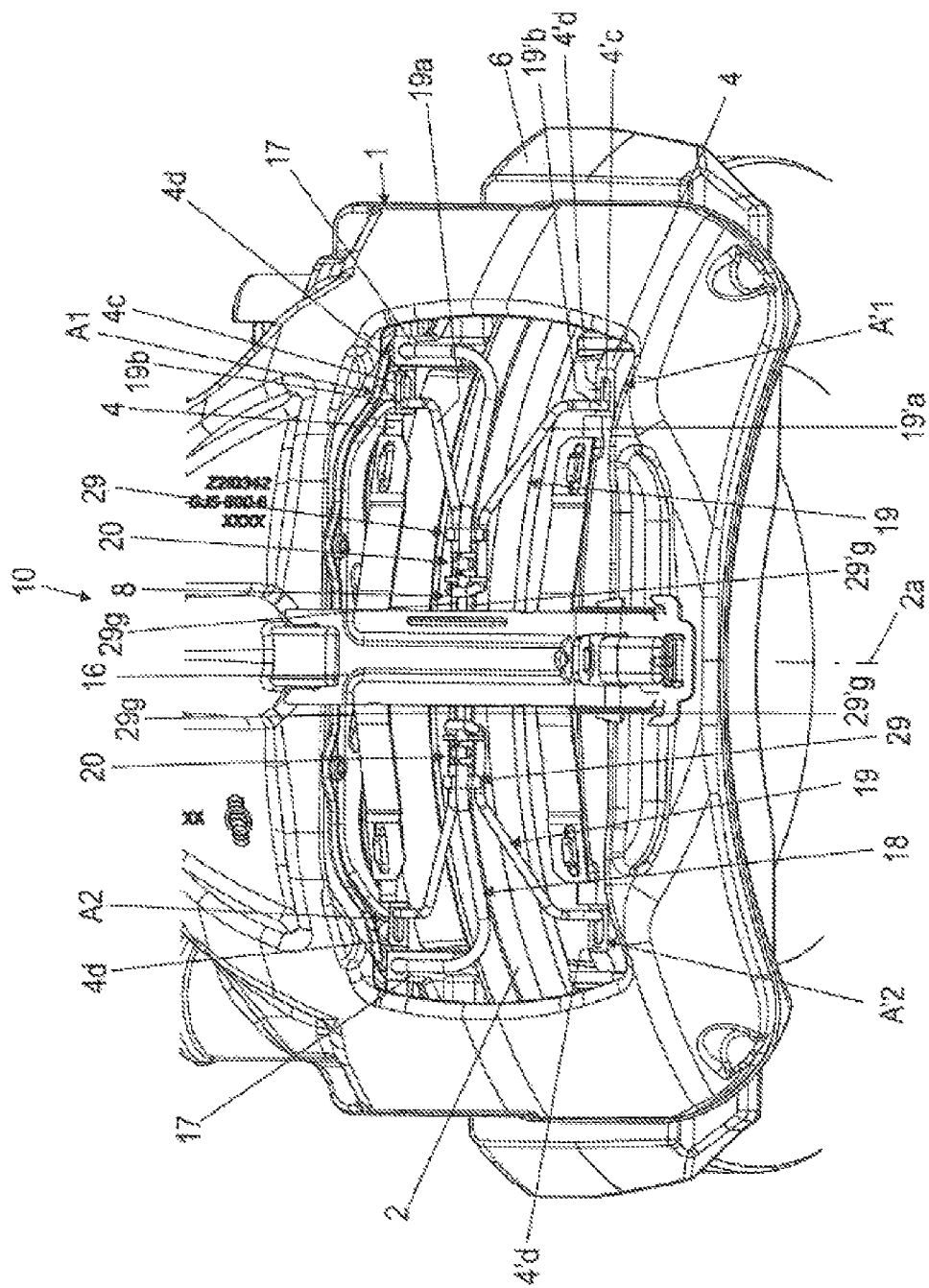
FIGS. 23-24 show the disk brake according to the invention according to FIGS. 21-22 with a first variant of attachment interfaces.
Figure 24:
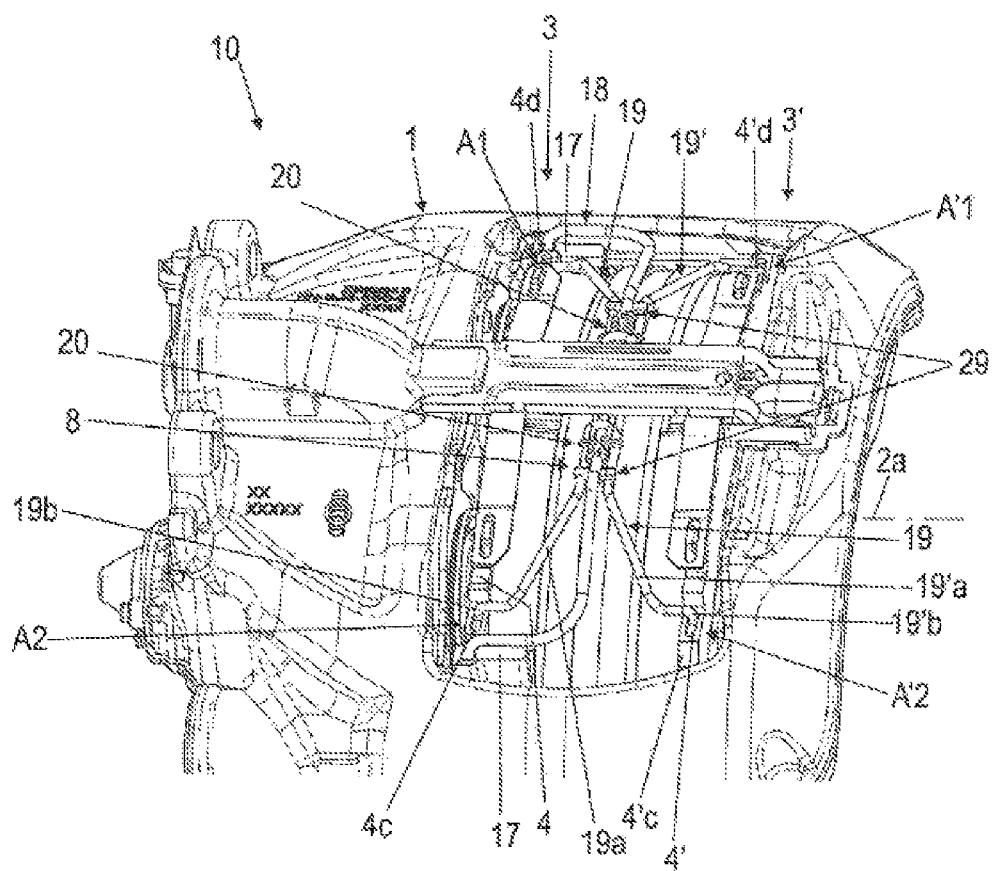

FIGS. 23-24 show the disk brake 10 according to the invention according to FIGS. 21-22 with a first variant of attachment interfaces A1, A'1, A2, A'2.

Here, the receiving openings 4*c*, 4'*c* are formed as milled or cast elongated holes. These elongated holes can take the form of blind holes and/or of through-holes.

Figure 25:
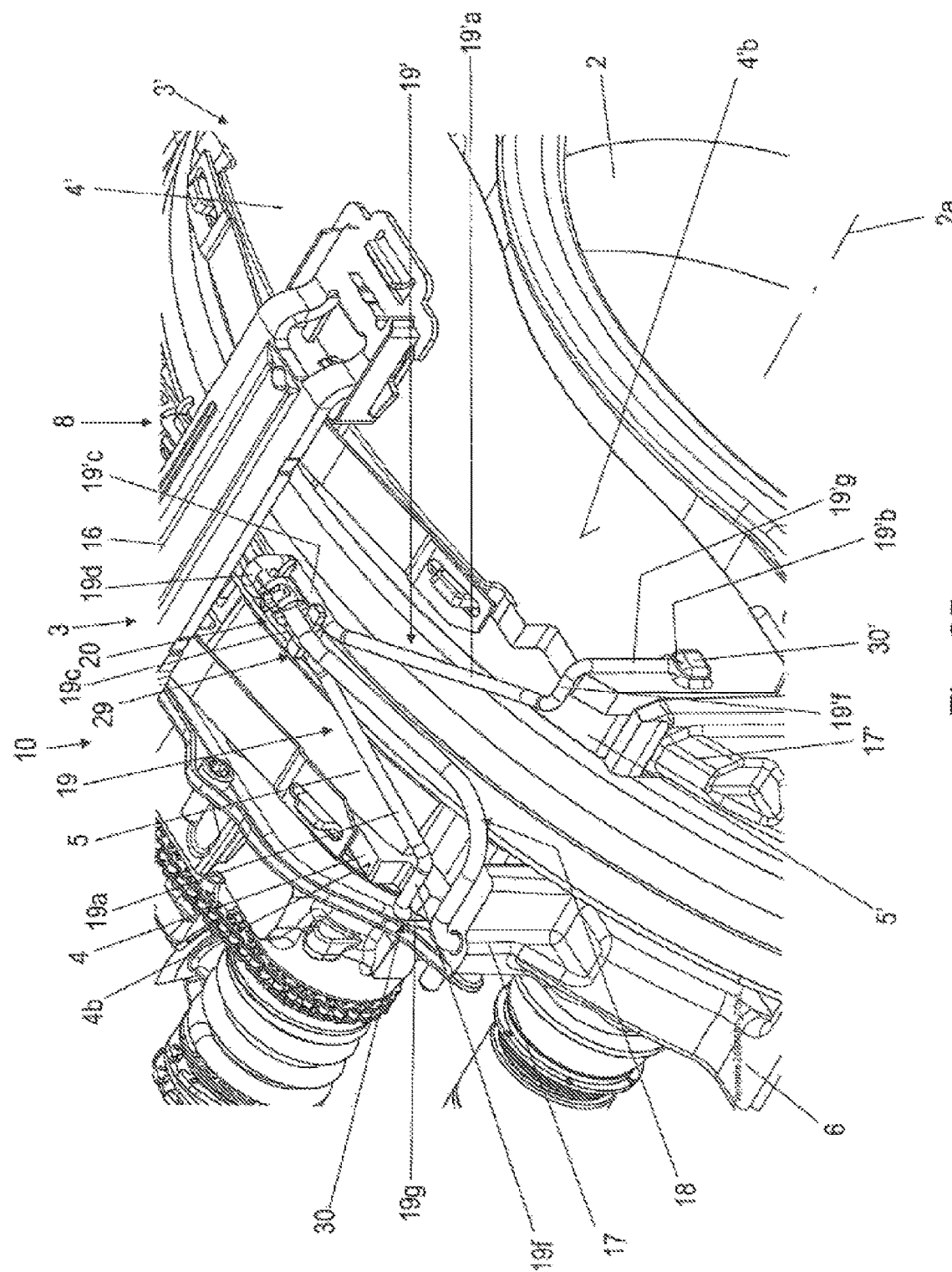
FIG. 25 shows the disk brake according to the invention according to FIGS. 21-22 with a second variant of attachment interfaces.

FIG. 25 illustrates the disk brake 10 according to the invention according to FIGS. 21-22 with a second variant of attachment interfaces A1, A'1, A2, A'2, wherein the attachment sections 19*b*, 19'*b* of the spring arms 19*a*, 19'*a* are attached to connection sections 19*g*, 19'*g* configured as extensions and in bores which are incorporated, for example, in a sprue 30, 30' in the center of the friction radius on the thrust sides 4*b*, 4'*b* of the pad rear plates 4, 4'. Tilting of the brake pads 3, 3' is thereby counteracted.

The connection sections 19*g*, 19'*g* are in turn connected by their upper ends to the associated spring arm 19*a*, 19'*a* via in each case a further connection section 19*f*, 19'*f*. Here, the connection sections 19*g*, 19'*g* extend parallel to the respective thrust side 4*b*, 4'*b* of the pad carrier plate 4, 4', wherein the connection sections 19*f*, 19'*f* are attached at approximately a right angle to the upper ends of the connection sections 19*g*, 19'*g* and extend parallel to the brake disk axis of rotation 2*a* over a section of the top side 4*d*, 4'*d* of the respective pad carrier plate 4, 4' and can lie on this section of the top side 4*d*, 4'*d*.

Figure 26:
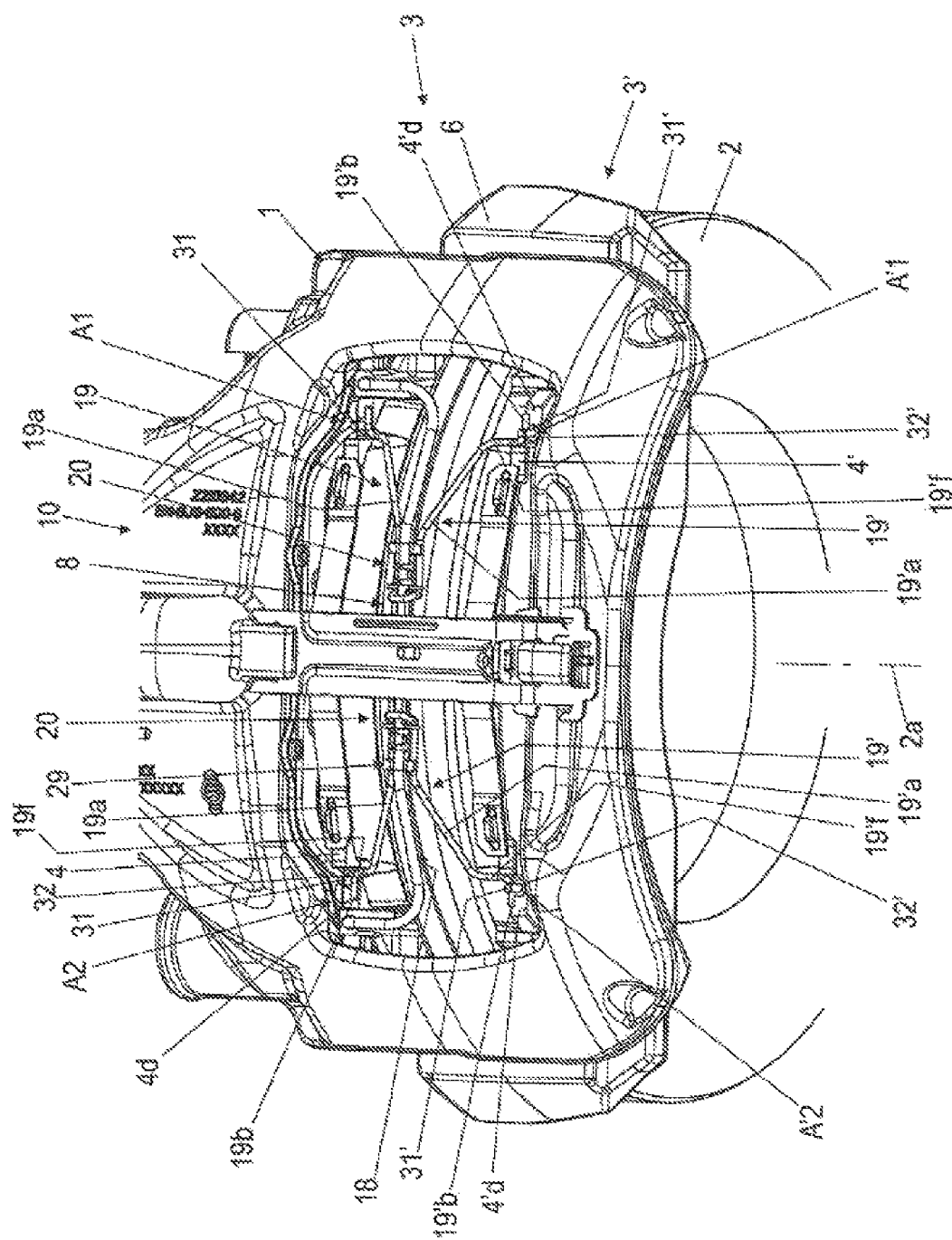
FIGS. 26-27 show the disk brake according to the invention according to FIGS. 21-22 with a third variant of attachment interfaces.
Figure 27:
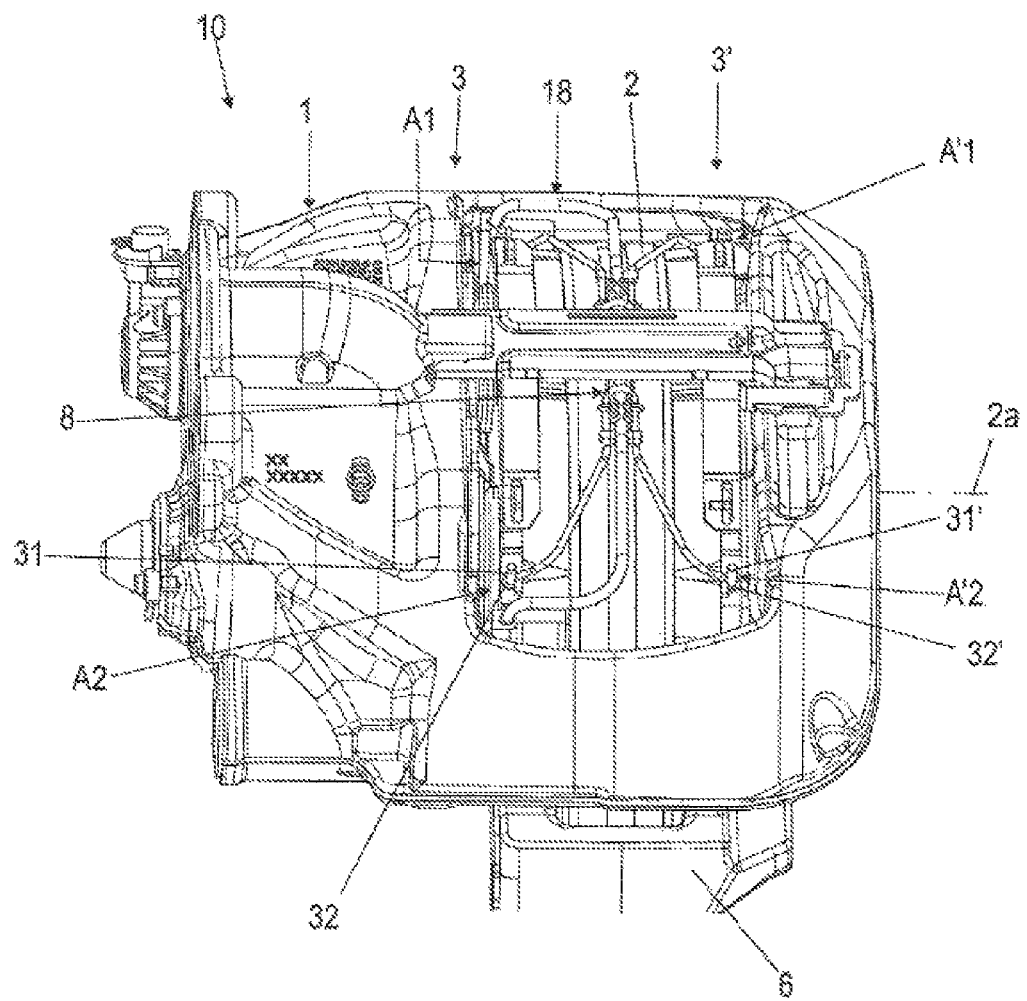

FIGS. 26-27 show the disk brake 10 according to the invention according to FIGS. 21-22 with a third variant of attachment interfaces A1, A'1, A2, A'2. The spring arms 19*a*, 19'*a* bear laterally by way of their attachment sections 19*b*, 19'*b* against a cylinder pin 31 in the pad rear plate 4, 4'. The cylinder pins 31 are inserted into fitting bores and optionally have a shoulder 32. The shoulder 32 serves to prevent a relative movement between the stainless steel of the attachment sections 19*b*, 19'*b* and the cast material of the pad rear plate 4, 4'.

FIG. 28 shows the disk brake 10 according to the invention according to FIGS. 21-22 with a third variant of attachment interfaces A1, A'1, A2, A'2. In this third variant, the attachment interfaces A1, A'1, A2, A'2 each comprise a guide element 33 with guide sections 33*a*. The guide sections 33*a* extend parallel to one another in the longitudinal direction of the pad rear plate 4, 4' and define a guide receptacle 33*b* between them. The attachment sections 19*b*, 19'*b* of the spring arms 19*a*, 19'*a* are in engagement with the respective guide receptacle 33*b*. The guide element 33 is pressed into the pad rear plate 4, 4' for example, can, for example, be produced from stainless steel and prevents a relative movement between the hard spring material of the attachment sections 19*b*, 19'*b* and the soft cast material of the pad rear plate 4, 4'.

Figure 29:
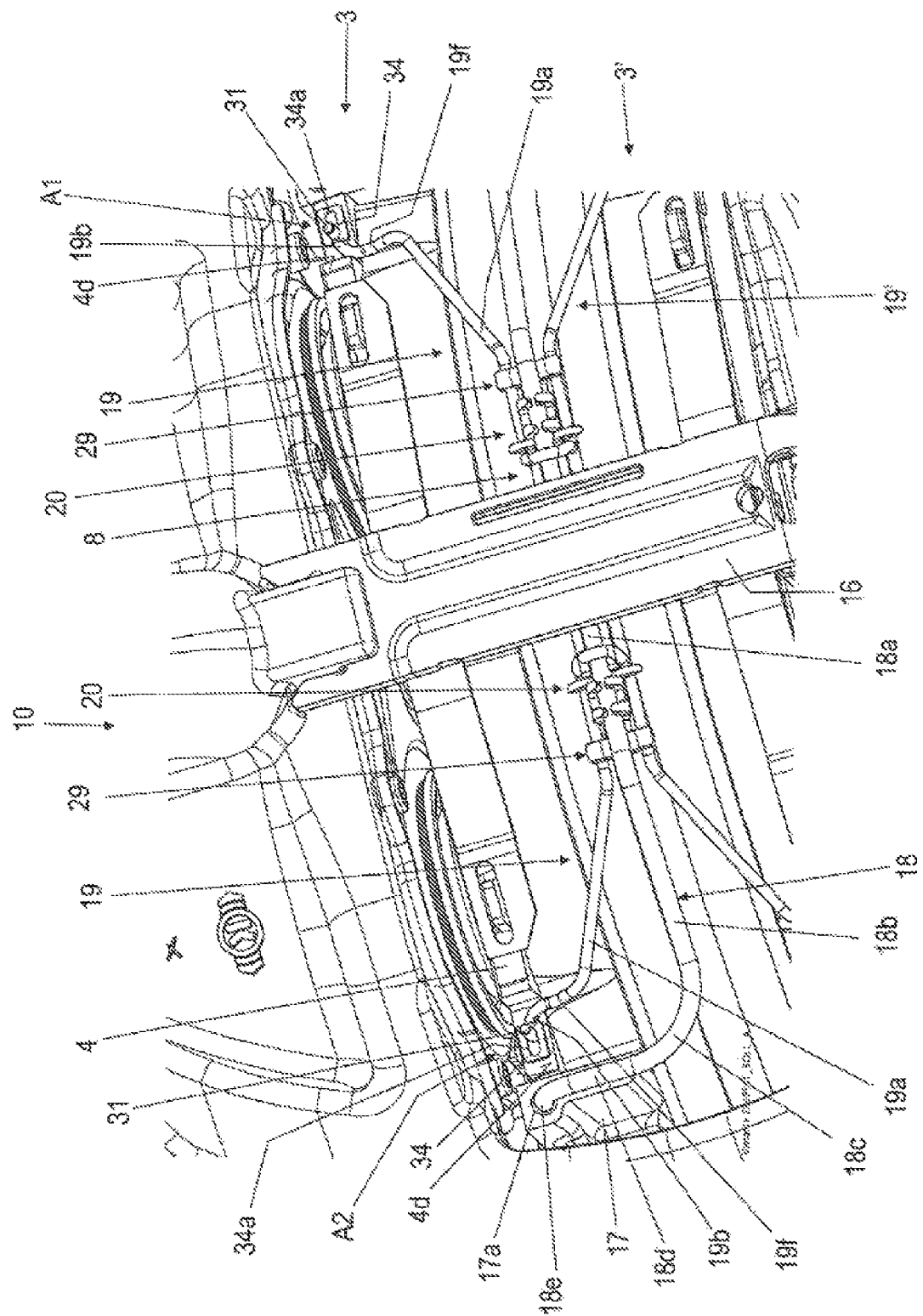
FIG. 29 shows the disk brake according to the invention according to FIGS. 21-22 with a fourth variant of attachment interfaces.

FIG. 29 illustrates the disk brake 10 according to the invention according to FIGS. 21-22 with a fourth variant of attachment interfaces.

The attachment sections 19*b*, 19'*b* of the spring arms 19*a*, 19'*a* are pressed flat at the end to form flat end sections 34 in order that an elongated hole 34*a* can then be punched out. Said elongated hole 34 can be placed over a cylinder pin 31, for example.

Figure 30:
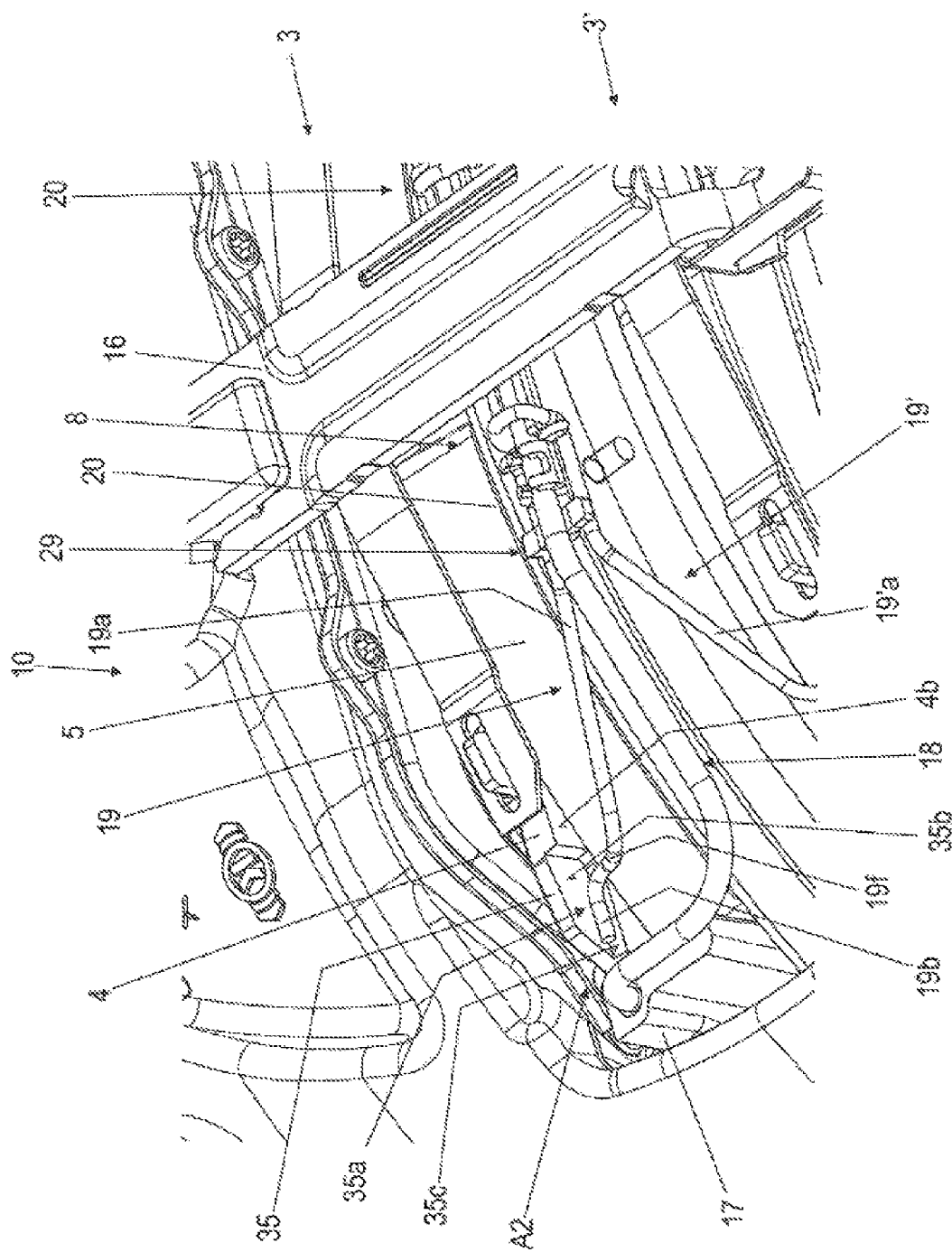
FIG. 30 shows the disk brake according to the invention according to FIGS. 21-22 with a fifth variant of attachment interfaces.

FIG. 30 shows the disk brake 10 according to the invention according to FIGS. 21-22 with a fifth variant of attachment interfaces A1, A'1, A2, A'2. The attachment sections 19*b*, 19'*b* of the spring arms 19*a*, 19'*a* are guided on a corner section 35 of the pad rear plate 4, 4' on a milled shoulder 35*a*. The shoulder 35*a* has a thrust surface 35*b* and a bearing surface 35*c*. The thrust surface 35*b* is here parallel to the pad side 4*b*, 4'*b* of the pad rear plate 4, 4'. The attachment sections 19*b*, 19'*b* are in contact with the thrust surface 35*b* and the bearing surface 35*c*.

Figure 31:
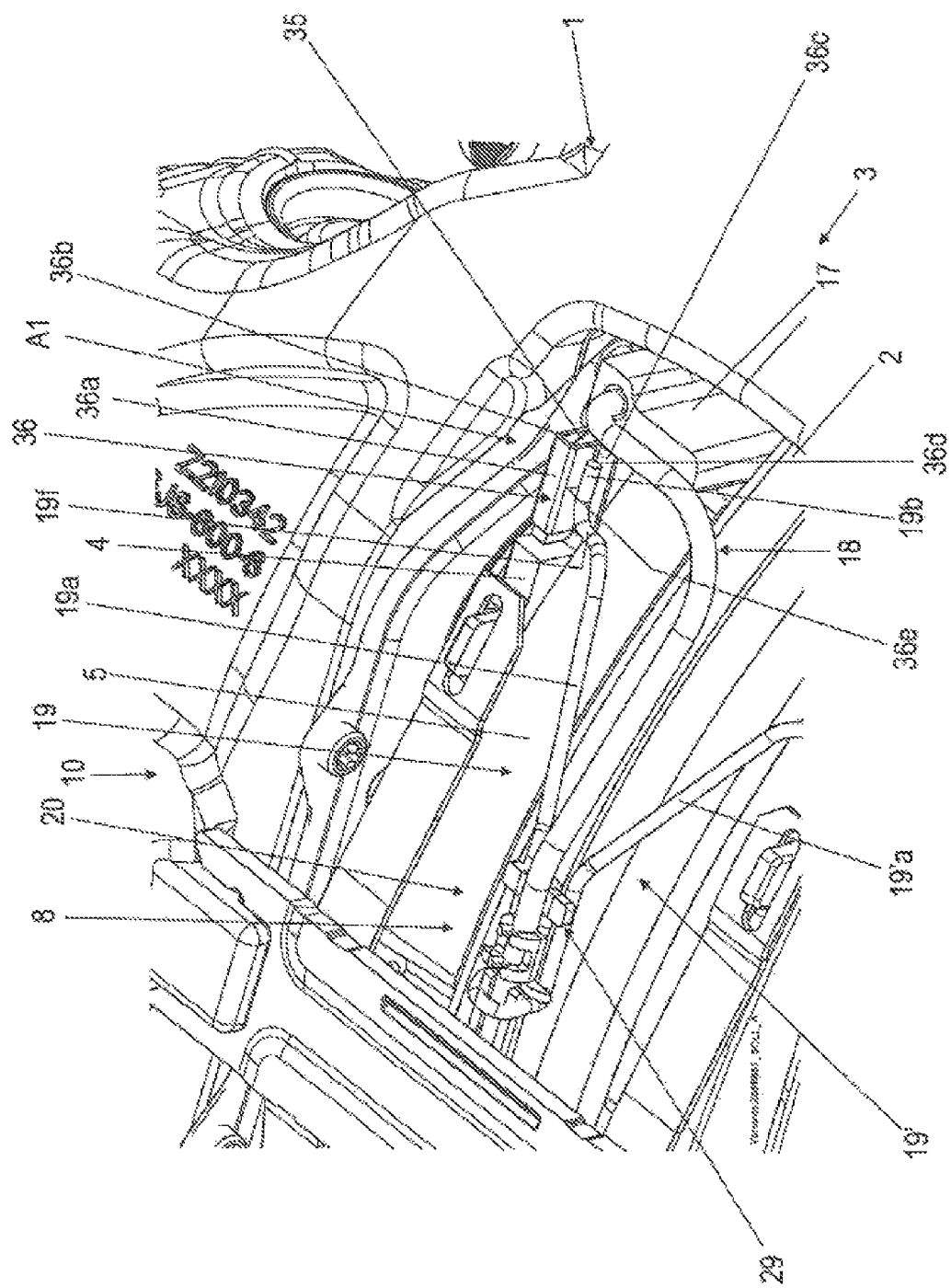
FIG. 31 shows the disk brake according to the invention according to FIGS. 21-22 with a sixth variant of attachment interfaces.

FIG. 31 illustrates the disk brake 10 according to the invention according to FIGS. 21-22 with a sixth variant of attachment interfaces A1, A'1, A2, A'2.

A guide element consisting, for example, of stainless steel is fitted over the milled shoulder 35 in the pad rear plate 4, 4' and, where appropriate, welded or adhesively bonded. The attachment sections 19*b*, 19'*b* of the spring arms 19*a*, 19'*a* can be guided over this additional component.

Figure 32:
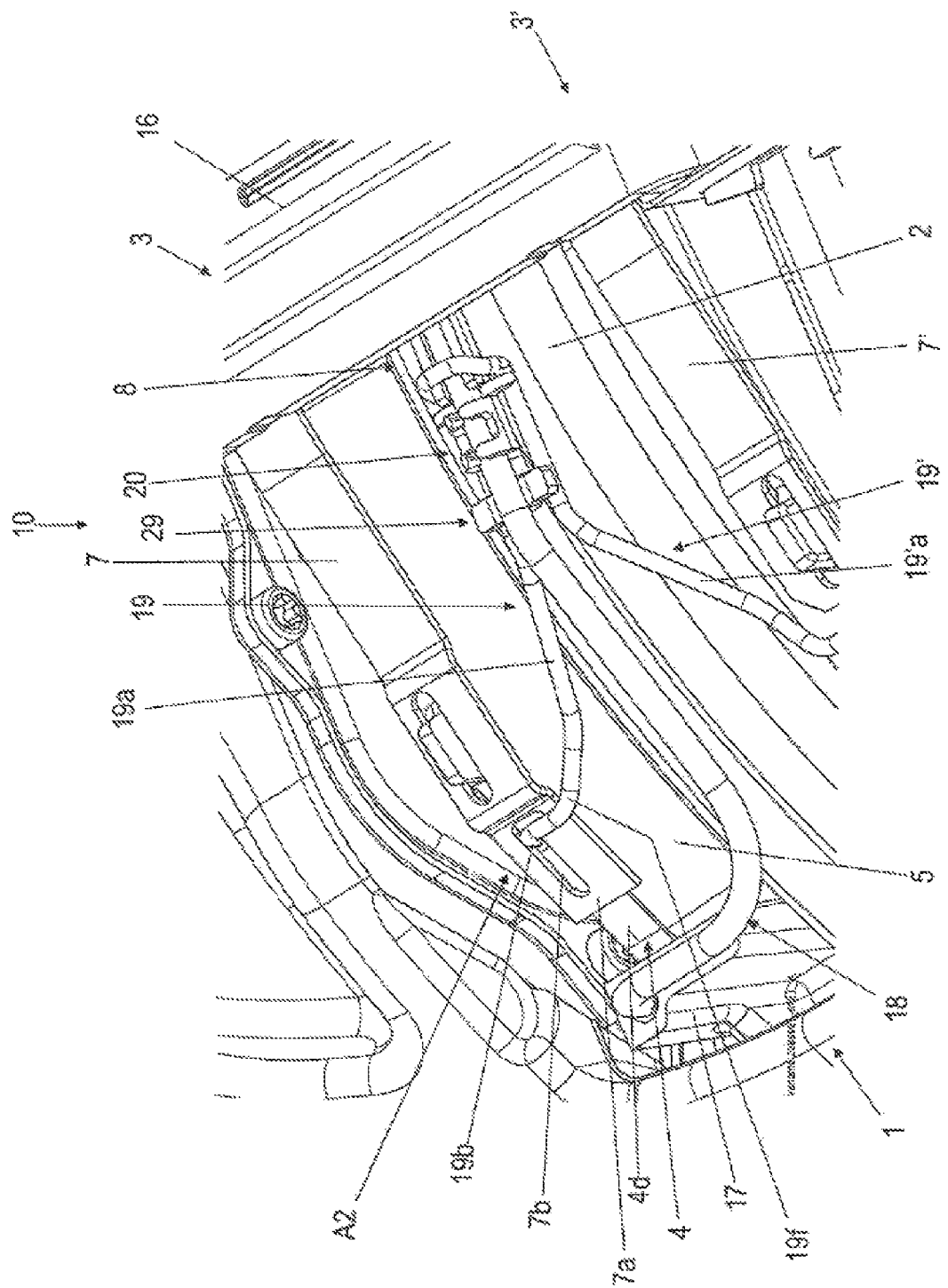
FIG. 32 shows the disk brake according to the invention according to FIGS. 21-22 with a seventh variant of attachment interfaces.

FIG. 32 shows the disk brake 10 according to the invention according to FIGS. 21-22 with a seventh variant of attachment interfaces A1, A'1, A2, A'2. In this variant, the attachment sections 19*b*, 19'*b* of the spring arms 19*a*, 19'*a* are in engagement with in each case a spring end 7*a*, 7'*a* of the pad retaining springs 7, 7' in elongated holes 7*b*.

Figure 33:
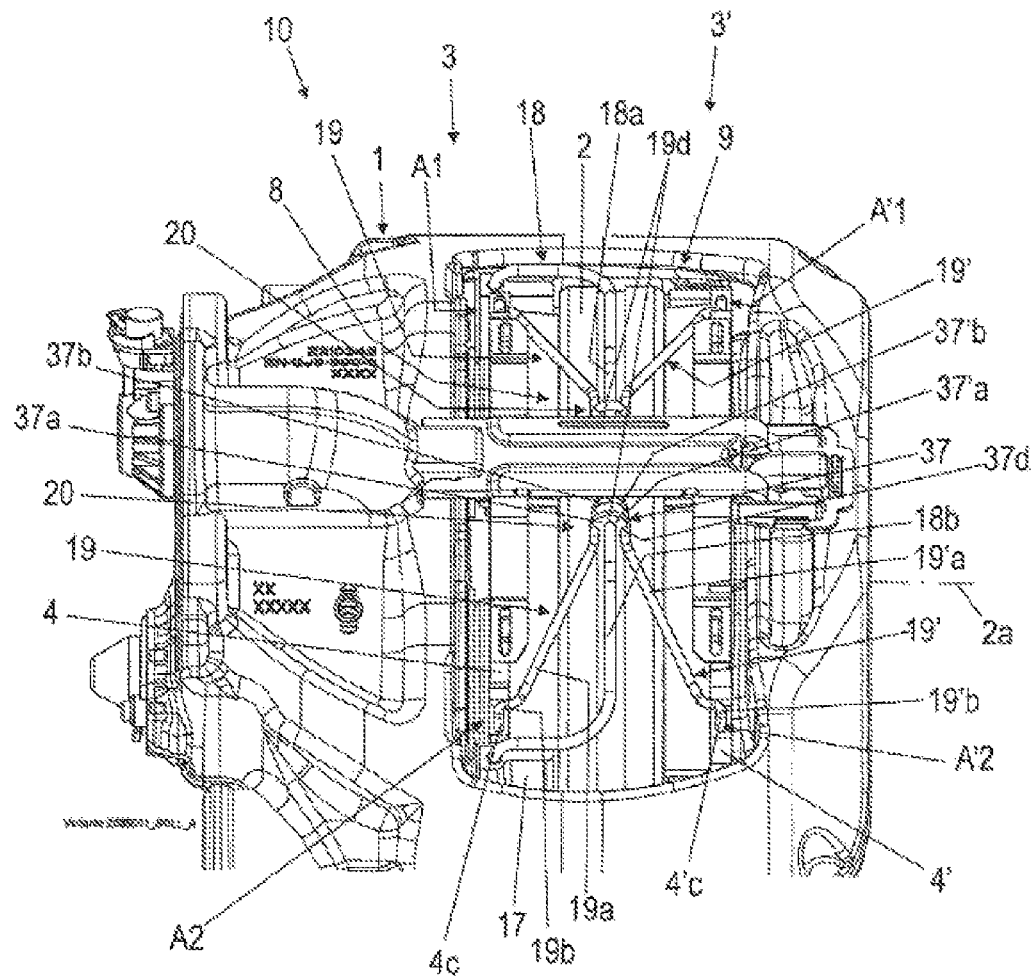
FIG. 33 shows the disk brake according to the invention according to FIG. 23 with a ninth variant of the connection interface.
Figure 34:
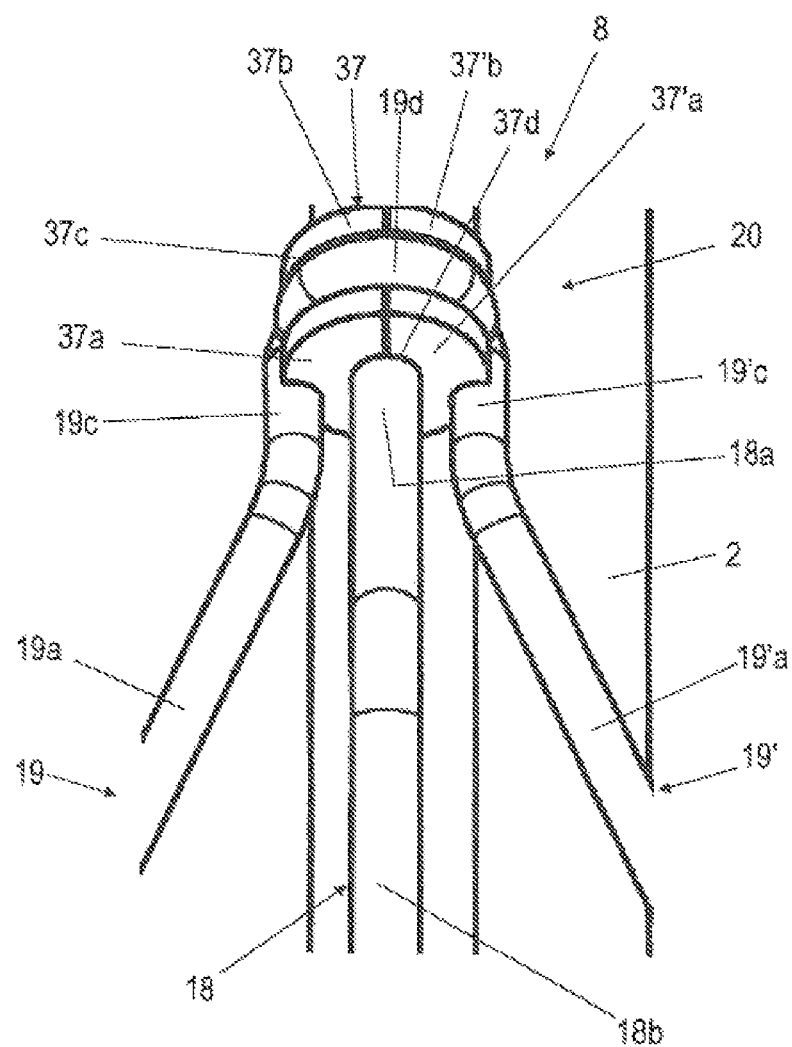
FIG. 34 shows an enlarged schematic perspective illustration of the ninth variant of the connection interface according to FIG. 33.

FIG. 33 illustrates the disk brake 10 according to the invention according to FIG. 23 with a ninth variant of the connection interface 20 with a connection element 37. FIG. 34 shows an enlarged schematic perspective illustration of the ninth variant of the connection interface 20 with the connection element 37 according to FIG. 33.

In the ninth variant, the connection element 37 has sleeve sections 37*a*, 37'*a*; 37*b*, 37'*b* with an interspace 37*c* and a leadthrough opening 37*d*. The ends of the connection sections 19*c*, 19'*c* of the spring unit 19, 19' and their connection bow 19*d* is press-fitted with the sleeve sections 37*a*, 37'*a*; 37*b*, 37'*b* on both sides. The central section 18*a* of the attachment element 18 extends through the leadthrough opening 37*d* of the sleeve sections 37*a*, 37'*a*; 37*b*, 37'*b*.

Figure 35:
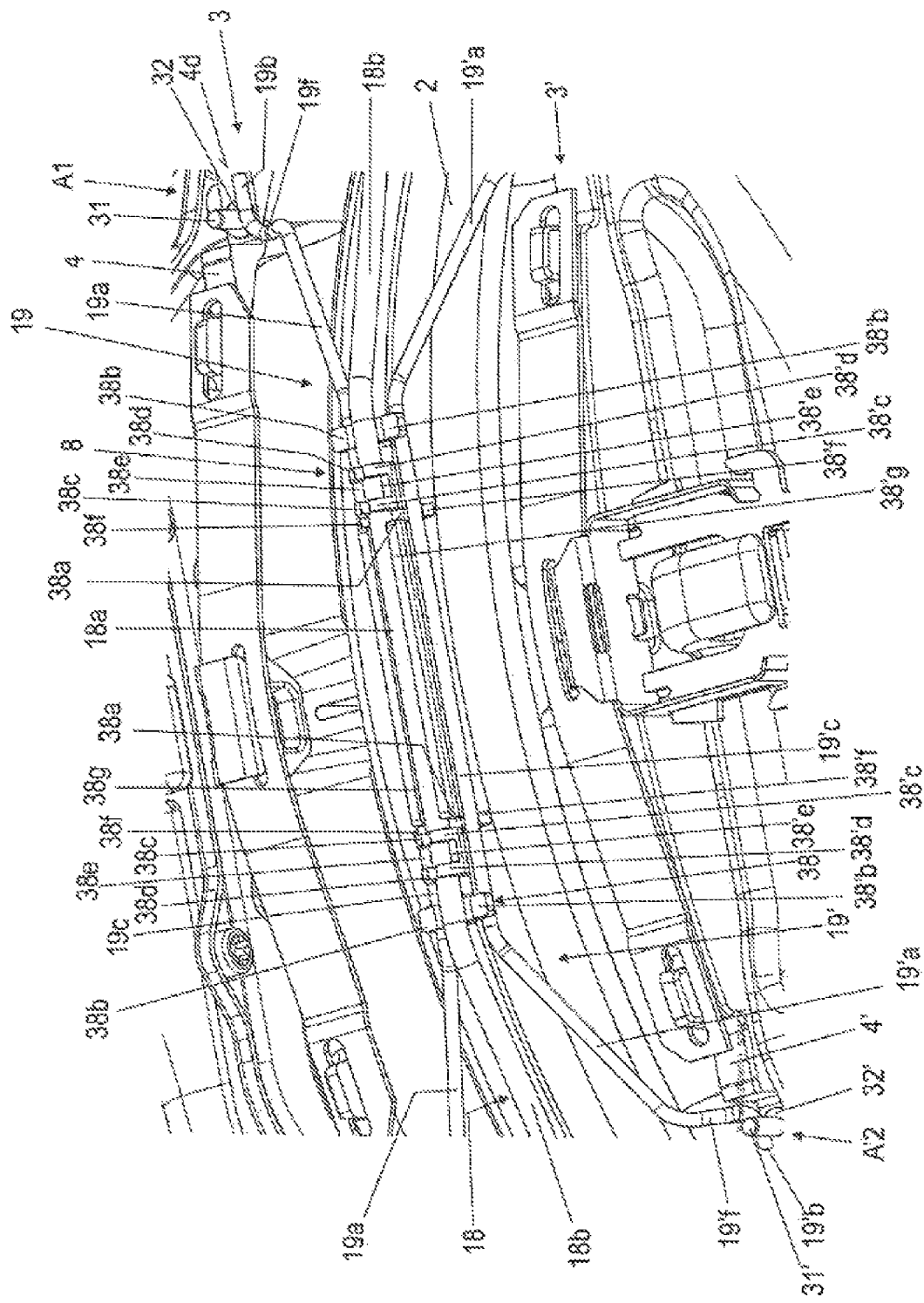
FIGS. 35-36 shows schematic partial views of the disk brake according to the invention according to FIGS. 26-27 with a fourth variant of the spreading device and the eighth variant of the connection interface according to FIG. 28.
Figure 36:
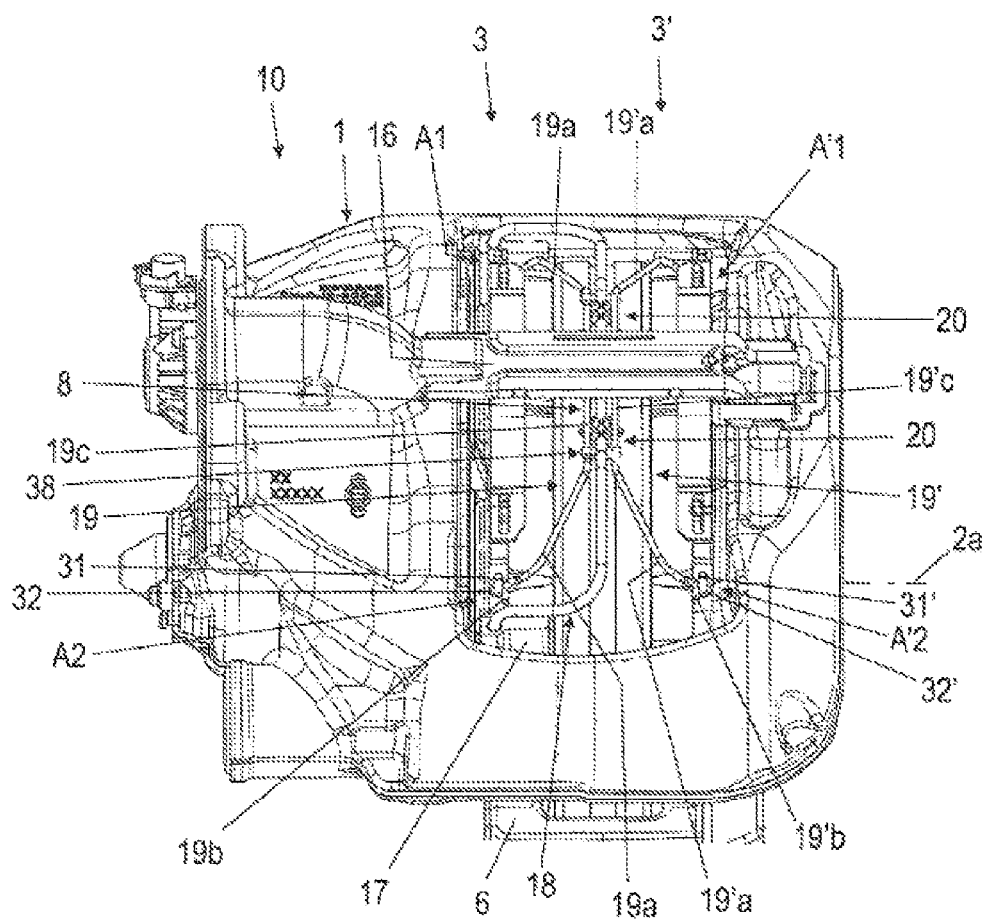

FIGS. 35-36 show schematic partial views of the disk brake 10 according to the invention according to FIGS. 26-27 with a fourth variant of the spreading device 8 and the eighth variant of the connection interface 20 according to FIG. 28.

The connection interface 20 here has a connection element 38 which is structurally similar to the connection element 29 (see for example FIG. 28).

The spring arm pairs of the spring units 19, 19' do not engage over the brake disk 2 here but are each arranged on one side of the brake disk.

Illustrated here is an attachment possibility for two spring arms 19a, 19'a which in one case are present continuously on the application side and in one case are present continuously on the caliper rear side. The spring arms 19a, 19'a are connected via extended connection sections 19c, 19'c. The extended connection sections 19c, 19'c extend parallel to and next to guide sections 38g, 38'g of the connection element 38.

Figure 37:
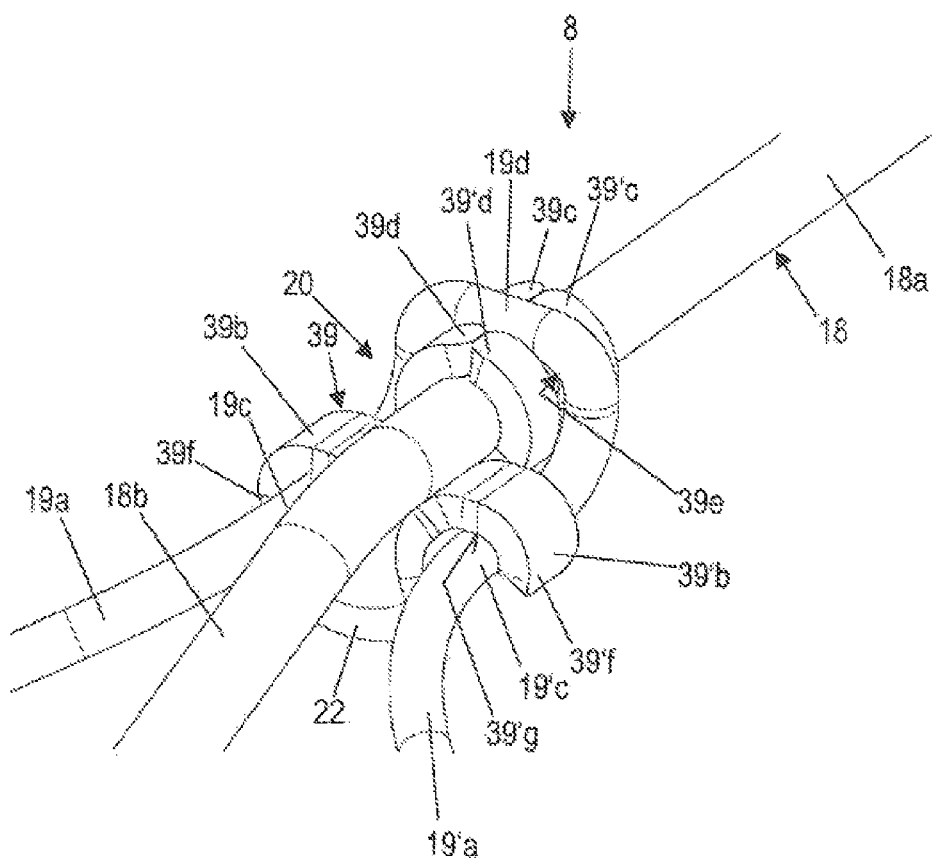
FIGS. 37-38 show enlarged schematic perspective partial illustrations of the spreading device according to FIG. 1 with a tenth variant of the connection interface.
Figure 38:
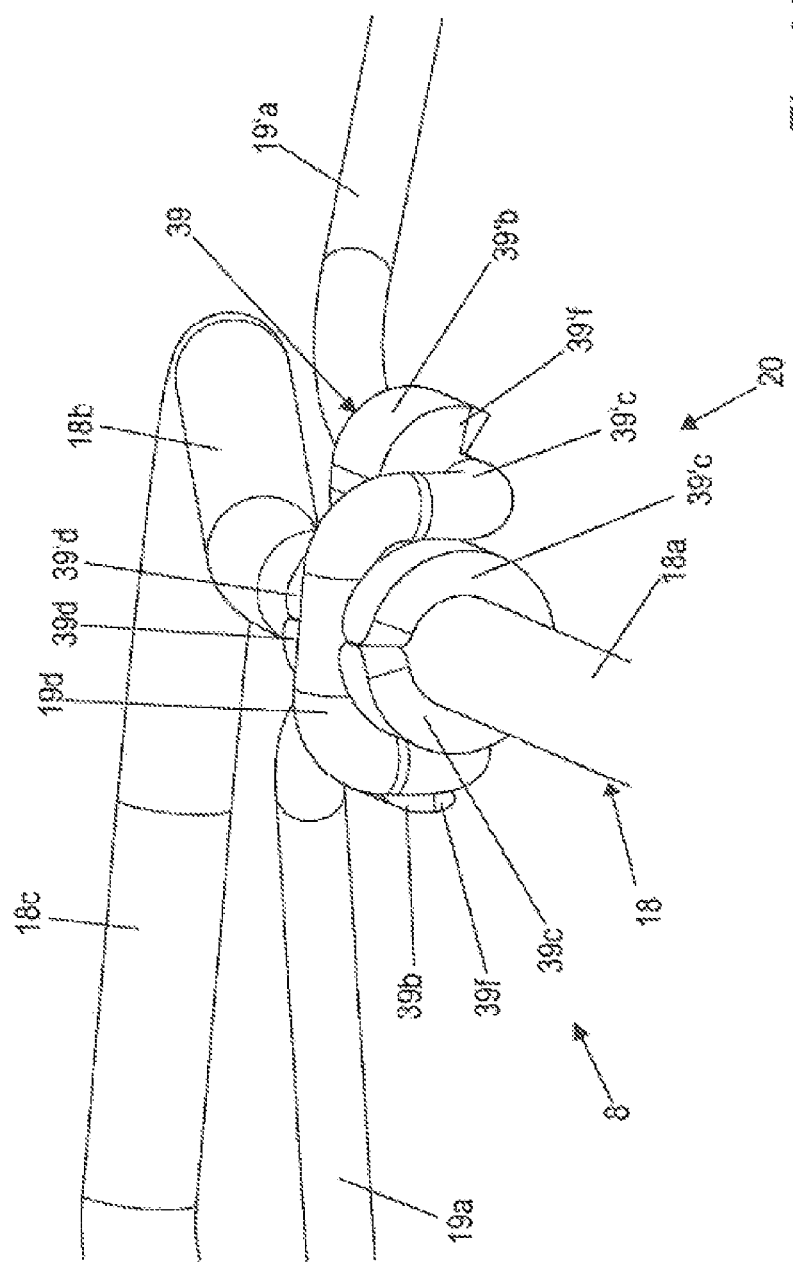
Figure 39:
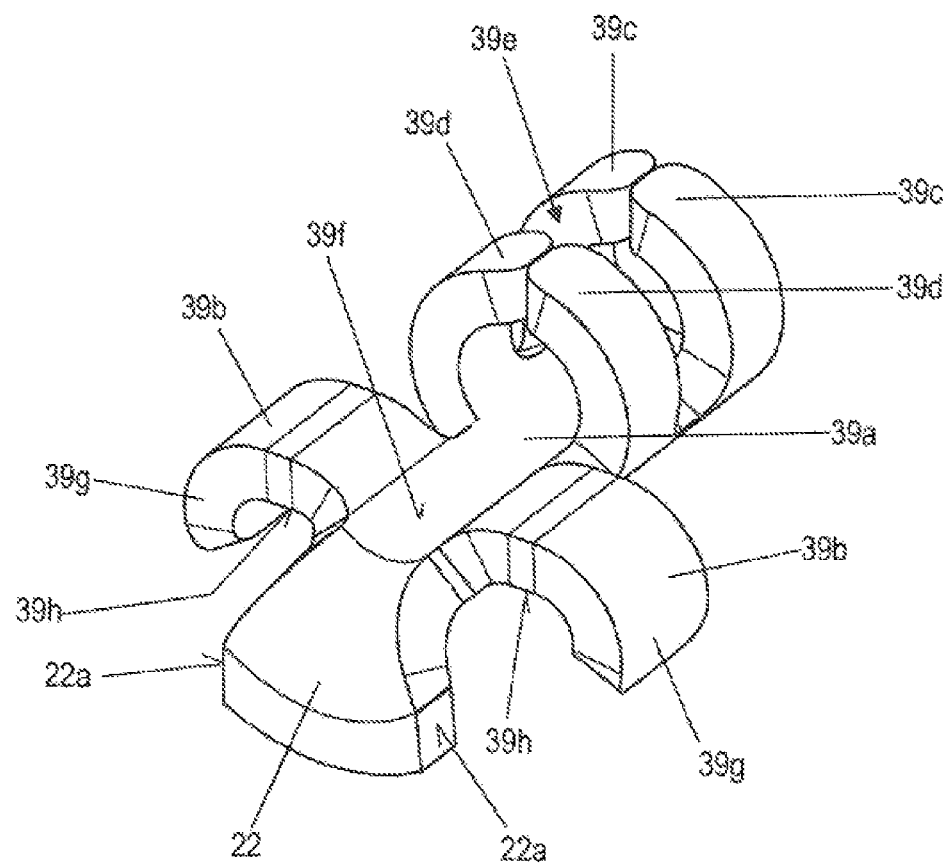
FIG. 39 shows an enlarged schematic perspective view of the tenth variant of the connection interface of the spreading device according to FIGS. 37-38.

FIGS. 37 and 38 illustrate enlarged schematic perspective partial illustrations of the spreading device 8 according to FIG. 1 with a tenth variant of the connection interface 20. FIG. 39 shows an enlarged schematic perspective view of the tenth variant of the connection interface of the spreading device 8 according to FIGS. 37-38 with a connection element 39.

The tenth variant of the connection interface 20 differs from the first variant of the connection interface 20 according to FIGS. 5, 6 and 7 in a varied connection element 39, wherein only some sections are formed differently, as will be explained below.

The connection element 39 comprises, like the connection element 21, a longitudinally extending base section 39a with a bearing section 39f, two mutually opposite wing sections 39b, 39'b and two mutually opposite pairs of sleeve sections 39c, 39'c; 39d, 39'd.

By contrast with the connection element 21, the two wing sections 39b, 39'b are formed convexly with in each case a downwardly pointing edge section 39g, 39'g, wherein rounded contact sections 39h, 39'h formed from the convex wing sections 39b, 39'b are arranged on the bottom sides of the convex wing sections 39b, 39'b. The wing sections 39b, 39'b with their contact sections 39h, 39'h correspond in their rounded shape to the outer shape of the connection sections 19c, 19'c of the spring arms 19a, 19'a.

The base section 39a is adapted to the round outer shape of the central section 18a of the attachment element 18, wherein, in the installed state, the central section 18a is arranged so as to extend on the base section 39a in its longitudinal direction. Here, the central section 18a lies between the wing sections 39b, 39'b on the bearing section 39f of the base section 39a and within the sleeve sections 39c, 39'c; 39d, 39'd on the base section 39a, as in the case of the connection element 21.

The associated spring unit 19, 19' is here, too, connected to the connection element 39 in such a way that the two connection sections 39c, 39'c extend parallel to the base section 39a of the connection element 39, below in each case a wing section 39b, 39'b, wherein the inner ends of the two connection sections 19c, 19'c are each upwardly bent in a 90° arc and then merge into the connection bow 19d. Here, the connection bow 19d extends between the sleeve sections 39c, 39'c; 39d, 39'd and is arranged within axial interspaces 39e, 39'e, which can also be referred to as gaps.

The spring arm unit 19, 19' extends through said gap and is thus supported in the gap, with the result that sliding out is avoided during a displacement in the longitudinal direction of the central section 18a of the attachment element 18.

In this way, the connection element 39 is connected to the spring unit 19, 19', wherein at the same time a connection is formed with the central section 18a of the attachment element 18, which extends, on the one hand, parallel to the connection sections 19c, 19'c of the spring unit 19, 19' on the base section 39a and, on the other hand, further through the sleeve sections 39c, 39'c; 39d, 39'd and below the connection bow 19d of the spring unit 19, 19'.

The connection element 39 also has the spacer section 22 as a lug which is inclined downwardly in the longitudinal direction of the base section 39a and of which the lateral sections 22a are in contact with in each case a spring arm 19a, 19'a. In this variant, too, the connection sections 19c, 19'c of the spring units 19, 19' bear against the lateral sections 22a of the spacer section 22. In operation, the spacer section 22 ensures a lateral support for the two spring arms in the inward direction, that is to say pointing in each case toward the spacer section 22, and thus defines a bearing point for the spring arms 19a, 19'a.

By contrast with the connection element 21 of the first variant of the connection interface 20 according to FIGS. 5, 6 and 7, the two wing sections 39b, 39'b, which can also be referred to as wing lugs, are inclined downwardly in a bow shape and safeguard, on the one hand, against a downwardly directed tilting of the spring arms 19a, 19'a and, on the other hand, against the spring arms 19a, 19'a sliding out upwardly.

During mounting, the spring arm unit 19, 19' is threaded in under the sleeve sections 39c, 39'c; 39d, 39'd and clipped into the two laterally downwardly projecting wing sections 39b, 39'b, which are formed in the manner of lugs.

The pad retaining springs 7, 7' are provided at each of their ends with a bevel. These bevels each point toward the brake disk 2 and serve to facilitate mounting and demounting of the spreading device 8, wherein the spring arms 19a, 19'a can be prevented from hooking on the ends of the pad retaining springs 7, 7' that point toward the brake disk 2. These bevels are not designated, but are clearly evident in FIGS. 1, 21-31, 33, 35-36.

Figure 40:
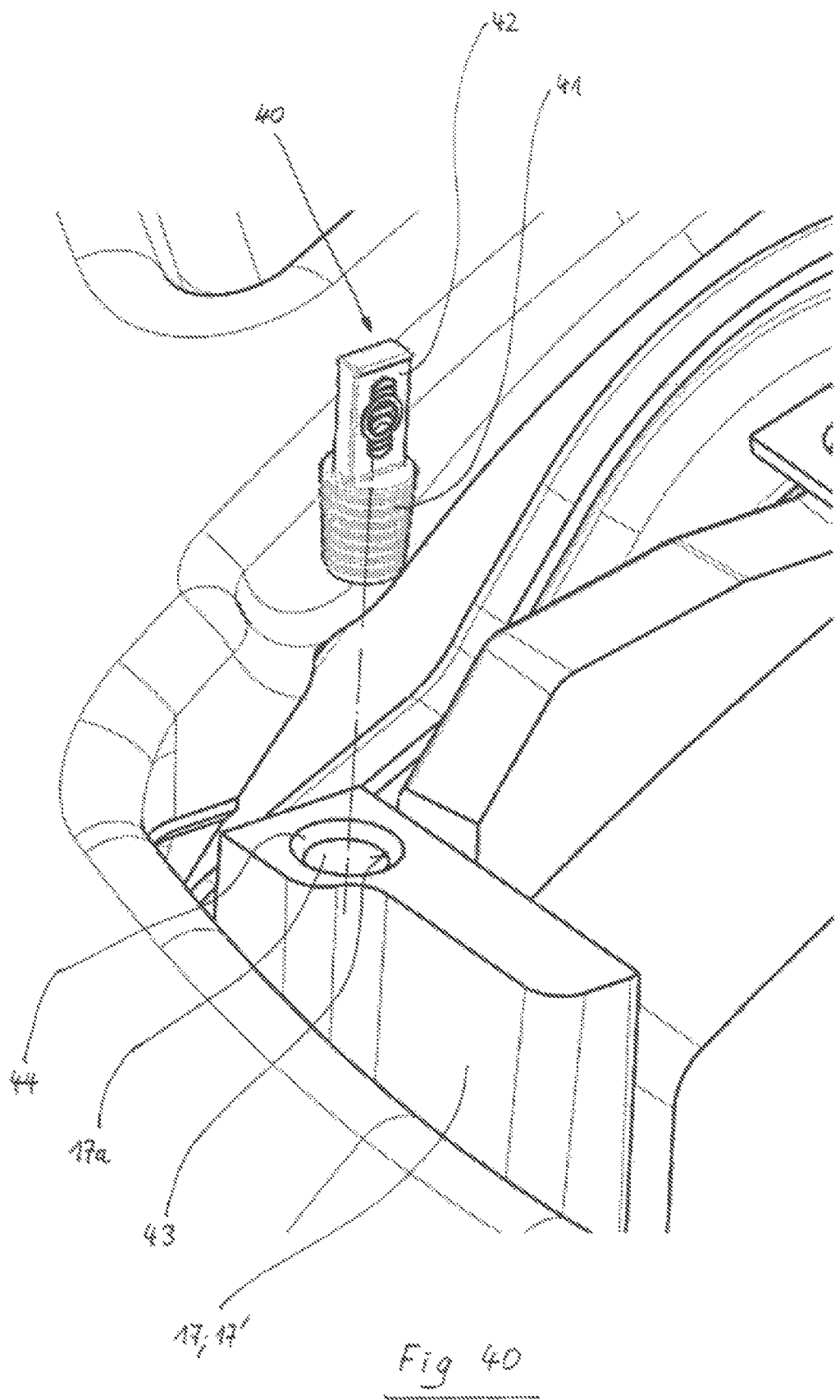
FIG. 40 shows a schematic perspective view of a brake carrier horn with a receiving opening and a plug.
Figure 41:
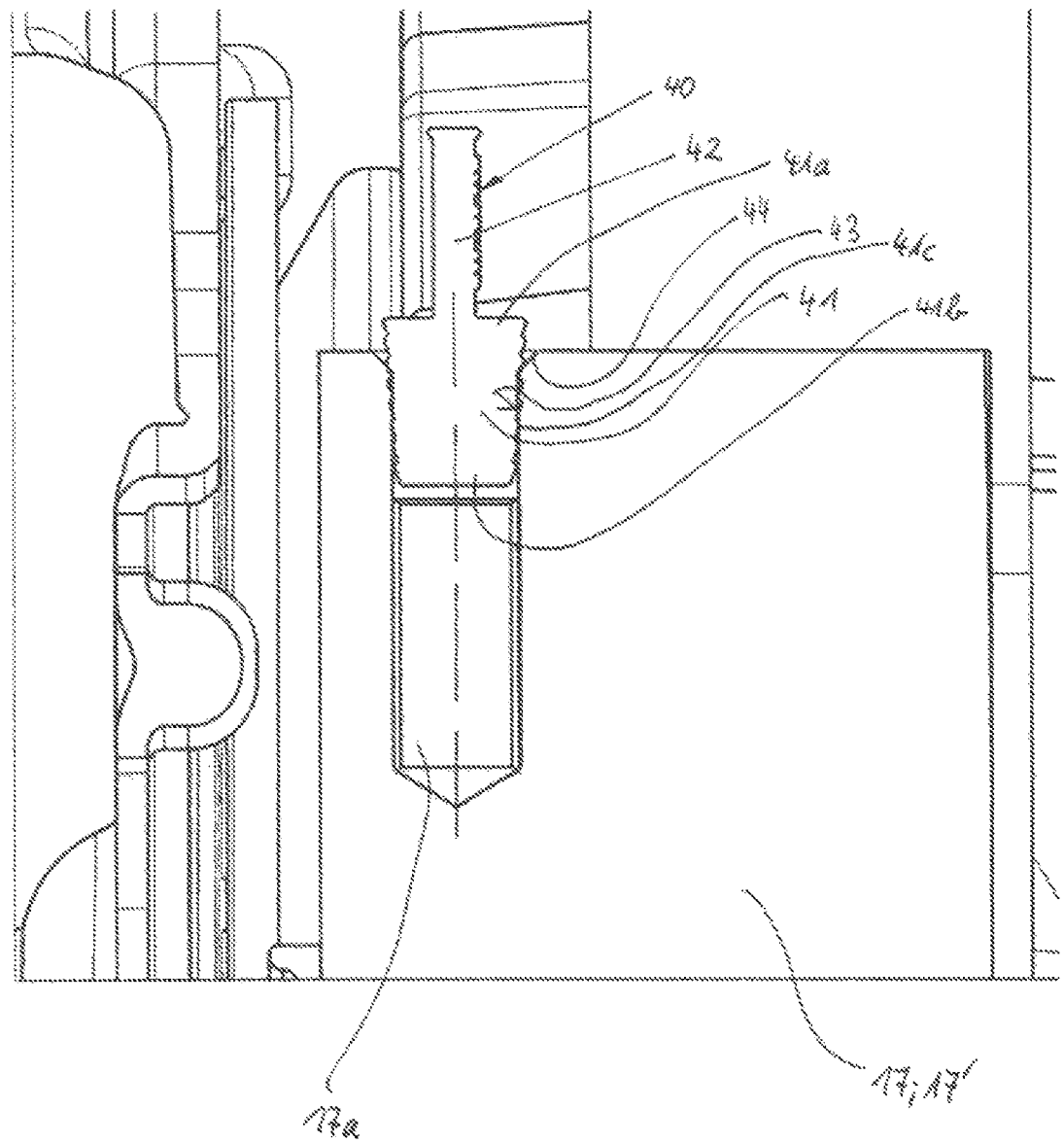
FIG. 41 shows a schematic sectional view of the brake carrier horn with inserted plug according to FIG. 40.
Figure 42:
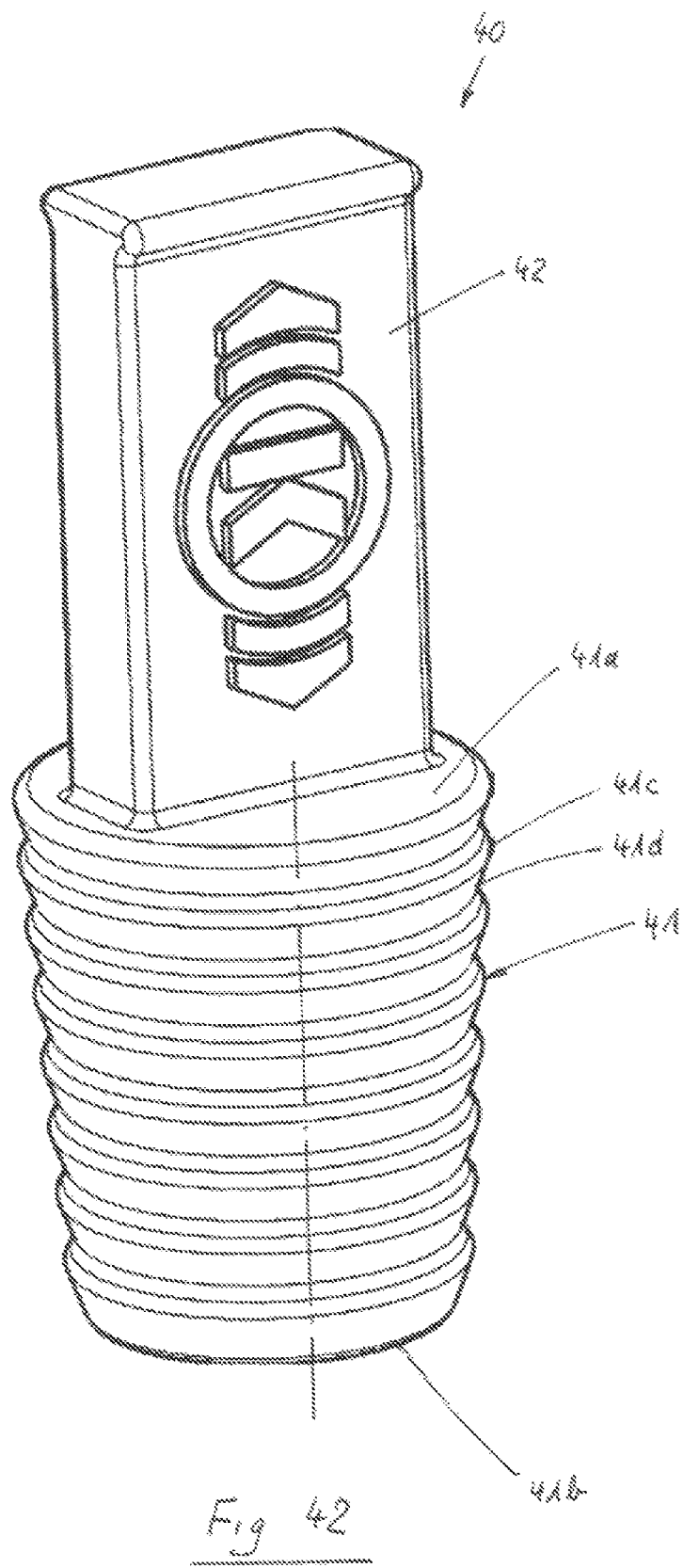
FIG. 42 shows an enlarged schematic perspective view of the plug according to FIGS. 40 and 41.

FIG. 40 shows a schematic perspective view of a brake carrier horn 17, 17' with a receiving opening 17a and a plug 40. FIG. 41 shows a schematic sectional view of the brake carrier horn 17, 17' with inserted plug 40 according to FIG. 40. FIG. 42 illustrates an enlarged schematic perspective view of the plug 40 according to FIGS. 40 and 41.

The plug 40 serves for closing the receiving openings 17a if the disk brake 1 is intended for subsequent retrofitting with a spreading device 8. In such a case, the brake carrier 6 with the brake carrier horns 17, 17' each having a receiving opening 17a can be already installed, wherein the unused receiving openings 17a are closed by a respective plug 40 and thus protected against contamination. The plug 40 can also be used for temporary protection of the receiving openings 17a in the case of maintenance and replacement of the spreading device 8.

The plug 40 has a body 41 and a handle 42. The body 41 is designed to be conical with an upper handle section 41a and a lower end section 41b, wherein the body 41 tapers in its longitudinal direction from the handle section 41a to the end section 41b. The body 41 additionally has peripheral beads 41c between which peripheral recesses 41d are arranged. The beads 41c and the recesses 41d are successively arranged, coaxially to a longitudinal axis of the body 41, on said body in its longitudinal direction.

The handle 42 is mounted on the handle section 41a of the body 41. The handle 42 has a parallelepipedal shape and is provided at its upper free end with bead-form edges for easier handling. A length of the handle 42 corresponds approximately to a length of the body 41 in the longitudinal direction.

An average diameter of the body 41 corresponds to the inside diameter of the receiving openings 17a.

One material of the plug 40 is a heat-resistant plastic. The plug 40 can also have a metal core which is overmolded with a plastic which forms the beads 41c. The beads 41c are substantially elastic.

As shown in FIG. 41, the plug 40 is inserted, with its lower end 41b leading, into the receiving opening 17a into the brake carrier horn 17, 17'. Here, the body 41 has approximately three quarters of its length received in the receiving opening 17a. The elastic beads 17 are here compressed, are in contact with an inner wall 43 of the receiving opening 17a and thus seal the receiving opening 17a with respect to the surroundings.

The receiving openings 17a here take the form of blind holes and have bevels 44 on their top side for easier threading in of the fastening sections 18e of the attachment element 18, as for the plug 40. The receiving openings 17a can also be through-holes, in which case a further plug 40 is provided in each case.

The receiving openings 4c, 4'c of the attachment interfaces A1, A'1; A2, A'2 take the form of through-holes and/or blind holes, as already described above. In both cases, the receiving openings 4c, 4'c allow a stable seat for the attachment sections 19b, 19'b.

The receiving openings 4c, 4'c of the attachment interfaces A1, A'1; A2, A'2 can extend, for example, over one quarter, one third, two quarters, two thirds, three thirds or more, or over the entire lateral length (as through-hole) of a brake pad 3, 3'. Here, the lengths of the attachment sections 19b, 19'b can correspond to the lengths of the receiving openings 4c, 4'c. In this way, an introduction of force of the spreading device 8 to the brake pads 3, 3' for resetting is exerted which can thus extend beyond the whole side of the brake pads 3, 3'.

In the case that the receiving openings 4c, 4'c of the attachment interfaces A1, A'1; A2, A'2 take the form of blind holes, the attachment sections 19b, 19'b can bear with their ends in contact with the respective blind hole bottom, wherein the attachment sections 19b, 19'b can then have their peripheral surfaces in contact with the respective inner wall of the associated receiving opening 4c, 4'c.

It is furthermore conceivable that the attachment sections 19b, 19'b are provided with sleeves, wherein these sleeves are each pushed onto an attachment section 19b, 19'b. This is not illustrated, but can be easily envisioned. Such sleeves can of course also be pushed onto the fastening sections 18e of the attachment element 18.

The invention is not restricted by the exemplary embodiments described above. It may be modified within the scope of the appended claims.

LIST OF REFERENCE SIGNS

1 Brake caliper
2 Brake disk
2a Brake disk axis of rotation
3, 3' Brake pad
4, 4' Pad carrier plate
4a Pad side
4b, 4'b Thrust side
4c, 4'c Receiving opening
4d, 4'd Top side
5, 5' Friction pad
6 Brake carrier
7, 7' Pad retaining spring
7a Spring end
7b Elongated hole
8 Spreading device
9 Opening
10 Disk brake
11 Application section
12 Caliper rear section
13 Tension strut
14, 15 Retaining section
16 Pad retaining clip
17, 17' Brake carrier horn
17a Receiving opening
18 Attachment element
18a Central section
18b, 18c, 18d Connection section
18e Fastening section
19, 19' Spring arm unit
19a, 19'a Spring arm
19b, 19'b Attachment section
19c, 19'c Connection section
19d Connection bow
19e, 19'e Bow section
19f, 19'f; 19g, 19'g Connection section
20 Connection interface
21 Connection element
21a Base section
21b, 21'b Wing section
21c, 21'c; 21d, 21'd Sleeve section
21e, 21'e Interspace
21f Bearing section
22 Spacer section
22a, 22'a Lateral section
22b Recess
23 Connection element
23a Base section
23b, 23'b Wing section
23c Bearing section
24 Connection element
24a Base section
24b, 24'b; 24d, 24'd Wing section
24c, 24'c; 24e, 24'e Guide section
24f, 24'f Fork guide
25 Pin
26 Guide element
26a Pin
26b, 26'b Disk section
27 Supporting section
27a, 27'a Bow section
28 Connection element
28a Winding
29 Connection element
29a Base section
29b, 29'b Wing section
29c, 29'c; 29d, 29'd Sleeve section
29e, 29'e Interspace
29f, 29'f Wing section
29g, 29'g Guide section
30, 30' Retaining projection
31, 31' Cylinder pin
32, 32' Shoulder
33 Guide element
33a Guide section
33b Guide receptacle
34 End section
34a Elongated hole
35 Corner section
35a Shoulder
35b Thrust surface
35c Bearing surface
36 Guide element 36a Base section
36b, 36c Wall section
36d Bearing section
37 Connection element
37a, 37'a; 37b, 37'b Sleeve section
37c Interspace
37d Leadthrough opening
38 Connection element
38a Base section
38b, 38'b Wing section
38c, 38'c; 38d, 38'd Sleeve section
38e, 38'e Interspace
38f, 38'f Wing section
38g, 38'g Guide section
39 Connection element
39a Base section
39b, 39'b Wing section
39c, 39'c; 39d, 39'd Sleeve section
39e, 39'e Interspace
39f Bearing section
39g, 39'g Edge section
39h, 39'h Contact surface
40 Plug
41 Body
41a Handle section
41b End section
41c Bead
41d Recess
42 Handle
43 Inner wall
44 Bevel
A1, A'1, A2, A'2 Attachment interface
AS Run-out side
ES Run-in side The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disk brake for a utility vehicle, comprising:
a brake caliper which engages over a brake disk and is in the form of a sliding caliper fastened to a positionally static brake carrier, and which has a central opening over the brake disk;
two brake pads which are arranged in the brake caliper and are movable in opposite directions and which have in each case one pad carrier plate and one friction pad fastened thereto, of which an action-side or application-side brake pad is pressable against the brake disk by way of an application device via at least one brake piston; and
at least one spreading device by which the brake caliper is resettable after a braking-induced displacement and release of the brake,
wherein
the spreading device has resilient spring units which act on the mutually opposite brake pads,
the spreading device is arranged in the central opening,
the spring units act directly or indirectly outside of the friction pads in at least two attachment interfaces of the brake pads that are arranged spaced apart from one another with respect to the center, and
the spring units are connected to a positionally static attachment element in at least one connection interface by at least one connection element.

2. The disk brake as claimed in claim 1, wherein
the at least one connection element forms a connection which is rotatable about a longitudinal axis of a central section of the attachment element.

3. The disk brake as claimed in claim 2, wherein
the at least one connection element forms a connection which is displaceable in the direction of a longitudinal axis of a central section of the attachment element.

4. The disk brake as claimed in claim 1, wherein
the at least one connection element has wing sections which are inclined downwardly in a bow shape and into which at least one spring unit is clipped.

5. The disk brake as claimed in claim 4, wherein
the at least one connection element has at least one spacer section as a lug which is inclined downwardly in the longitudinal direction of a base section of the at least one connection element, wherein lateral sections of the at least one spacer section are in contact with a spring unit.

6. The disk brake as claimed in claim 1, wherein
the at least one connection element is a metal stamped and bent part.

7. The disk brake as claimed in claim 1, wherein
each spring unit comprises a pair of spring arms which are connected by their inner ends which are directed toward the center of the opening.

8. The disk brake as claimed in claim 7, wherein
the pair of spring arms is formed in one piece.

9. The disk brake as claimed in claim 7, wherein
the other ends of the spring arms of each pair of spring arms have attachment sections which interact in the attachment interfaces of the brake pads.

10. The disk brake as claimed in claim 9, wherein
the attachment interfaces are arranged on the pad rear plates of the brake pads.

11. The disk brake as claimed in claim 10, wherein
the attachment interfaces have receiving openings in a form of through-holes and/or blind holes.

12. The disk brake as claimed in claim 11, wherein
the receiving openings take the form of bores and/or elongated holes.

13. The disk brake as claimed in claim 10, wherein
the attachment interfaces have pins.

14. The disk brake as claimed in claim 10, wherein
the attachment interfaces have guide elements.

15. The disk brake as claimed in claim 10, wherein
the attachment interfaces have shoulders with or without mounted guide elements.

16. The disk brake as claimed in claim 10, wherein
the attachment interfaces are arranged indirectly on the pad rear plates of the brake pads on pad retaining springs.

17. The disk brake as claimed in claim 1, wherein
the spring units and the positionally static attachment element are formed from a stainless steel with a circular cross section.

18. The disk brake as claimed in claim 1, wherein
the brake pads each have at least one pad retaining spring which is provided on each of its ends with a bevel.

19. The disk brake as claimed in claim 1, wherein
receiving openings of brake carrier horns of the brake carrier which are configured to receive corresponding ends of the spreading device are each closed by a plug if the spreading device is not present or is removed.

20. The disk brake as claimed in claim 19, wherein
the plug has a body which is conical with a handle section and an end section.

21. The disk brake as claimed in claim 20, wherein
the body has peripheral beads between which peripheral recesses are arranged.

22. The disk brake as claimed in claim 21, wherein
the handle section of the body is connected to a handle.

23. A brake pad set of a disk brake as claimed in claim 1, wherein
the disk brake comprises an application-side brake pad, a rear-side brake pad and a spreading device.

24. A disk brake for a utility vehicle, comprising:
a brake caliper which engages over a brake disk and is in the form of a sliding caliper fastened to a positionally static brake carrier, and which has a central opening over the brake disk;
two brake pads which are arranged in the brake caliper and are movable in opposite directions and which have in each case one pad carrier plate and one friction pad fastened thereto, of which an action-side or application-side brake pad is pressable against the brake disk by way of an application device via at least one brake piston; and
at least one spreading device by which the brake caliper is resettable after a braking-induced displacement and release of the brake,
wherein
the spreading device has resilient spring units which act on the mutually opposite brake pads,
the spreading device is arranged in the central opening,
the spring units act directly or indirectly outside of the friction pads in at least two attachment interfaces of the brake pads that are arranged spaced apart from one another with respect to the center,
the spring units are connected to a positionally static attachment element in at least one connection interface by at least one connection element,
the at least one connection element comprises windings in the manner of a coil, and
the attachment element extends through the windings.

25. The disk brake as claimed in claim 24, wherein
the windings of the at least one connection element are windings of sections of spring arms of the spring unit.

\* \* \* \* \*